United States Patent
Kato et al.

(10) Patent No.: US 12,135,394 B2
(45) Date of Patent: Nov. 5, 2024

(54) GATING CAMERA

(71) Applicant: KOITO MANUFACTURING CO., LTD., Tokyo (JP)

(72) Inventors: Daiki Kato, Shizuoka (JP); Masayuki Takahashi, Shizuoka (JP); Koji Itaba, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 245 days.

(21) Appl. No.: 17/701,756

(22) Filed: Mar. 23, 2022

(65) Prior Publication Data

US 2022/0214434 A1 Jul. 7, 2022

Related U.S. Application Data

(63) Continuation of application No. PCT/JP2020/036106, filed on Sep. 24, 2020.

(30) Foreign Application Priority Data

Sep. 26, 2019 (JP) .................... 2019-176006
Sep. 26, 2019 (JP) .................... 2019-176007
Sep. 30, 2019 (JP) .................... 2019-180897

(51) Int. Cl.
*G01S 17/931* (2020.01)
*G01S 7/484* (2006.01)
(Continued)

(52) U.S. Cl.
CPC ............ *G01S 7/4868* (2013.01); *G01S 7/484* (2013.01); *G01S 7/4865* (2013.01); *G01S 17/18* (2020.01); *G01S 17/931* (2020.01)

(58) Field of Classification Search
CPC .... G01S 7/4865; G01S 7/4868; G01S 17/931; G01S 17/18; G06V 10/00; G06V 20/58
See application file for complete search history.

(56) References Cited

U.S. PATENT DOCUMENTS 4,920,412 A 4/1990 Gerdt et al.
2010/0268225 A1 10/2010 Coe et al.
(Continued)

FOREIGN PATENT DOCUMENTS

DE 102019203216 A1 * 9/2019 ........... B60Q 1/0023
JP 2009257983 A 11/2009
(Continued)

OTHER PUBLICATIONS

Tobias Gruber, "Gated2Depth: Real-Time Dense Lidar From Gated Images", 2019 (Year: 2019).*
(Continued)

*Primary Examiner* — Maurice C Smith
(74) *Attorney, Agent, or Firm* — Sughrue Mion, PLLC

(57) ABSTRACT

An illumination apparatus illuminates probe light. A gating camera captures an image for each of image capture ranges divided in the depth direction. A camera controller controls a timing at which the illumination apparatus illuminates the probe light and a timing at which an image sensor is exposed such that each slice image output from the image sensor for each image capture range includes only an object included in the corresponding image capture range while changing the image capture range. An image processing unit generates a final image including the entire object of interest based on the multiple slice images that correspond to the multiple image capture ranges.

10 Claims, 26 Drawing Sheets

(51) Int. Cl.
  *G01S 7/486*   (2020.01)
  *G01S 7/4865*  (2020.01)
  *G01S 17/18*   (2020.01)

(56) References Cited

U.S. PATENT DOCUMENTS

| | | |
|---|---|---|
| 2015/0160340 A1 | 6/2015 | Grauer et al. |
| 2016/0134807 A1 | 5/2016 | Tsutsumi |
| 2017/0234976 A1 | 8/2017 | Grauer et al. |
| 2019/0056498 A1 | 2/2019 | Sonn et al. |
| 2019/0058867 A1 | 2/2019 | Retterath |

FOREIGN PATENT DOCUMENTS

| | | | |
|---|---|---|---|
| JP | 2014197824 A | 10/2014 | |
| JP | 2015527761 A | 9/2015 | |
| WO | 2013179280 A1 | 12/2013 | |
| WO | WO-2016092537 A1 * | 6/2016 | ............ G01S 17/18 |
| WO | 2017110413 A1 | 6/2017 | |
| WO | 2017110416 A1 | 6/2017 | |
| WO | WO-2017110417 A1 * | 6/2017 | ........... G01S 17/107 |
| WO | 2019167350 A1 | 9/2019 | |

OTHER PUBLICATIONS

International Preliminary Report on Patentability (PCT/IB/373) and Written Opinion (PCT/ISA/237) with English translation mailed Mar. 15, 2022, by the International Bureau of WIPO in International Application No. PCT/JP2020/036106.

International Search Report (PCT/ISA/210) with English translation mailed on Nov. 24, 2020, by the Japan Patent Office as the International Searching Authority for International Application No. PCT/JP2020/036106.

Extended European Search Report dated Oct. 14, 2022, issued in corresponding European Application No. 20870124.3. (8 pages).

* cited by examiner

IMGf

FIG. 8A

IMGs₁

IMGs₂

IMGs₃

IMGs₄

IMGs₅

IMGs₆

FIG. 8B

IMGc

FIG. 8C

IMGc

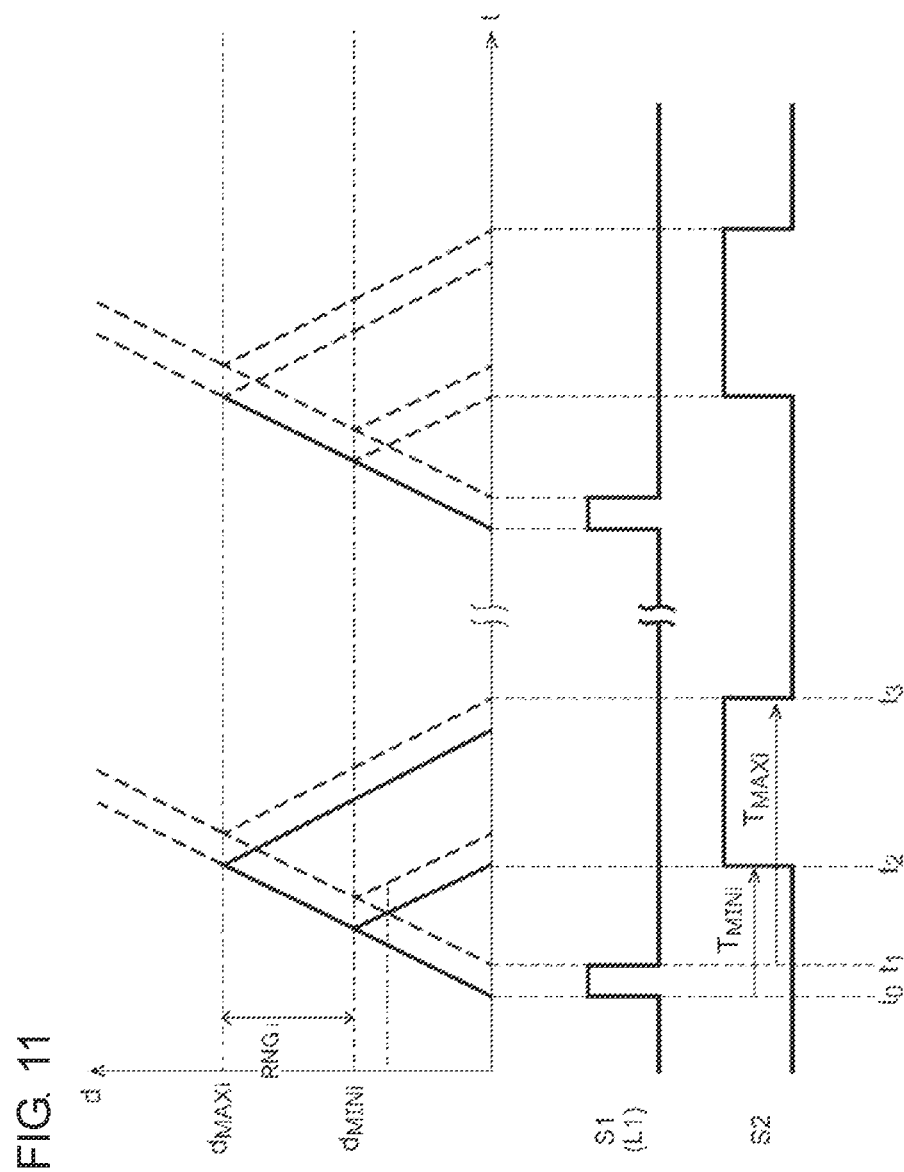

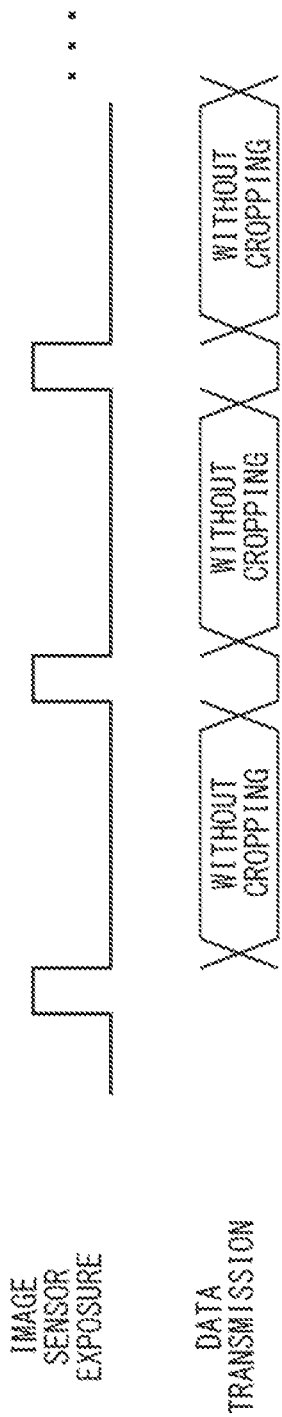

GATING CAMERA

BACKGROUND

1. Technical Field

The present disclosure relates to a gating camera.

2. Description of the Related Art

In order to support autonomous driving or autonomous control of the light distribution of a headlamp, an object identification system is employed for sensing the position and the kind of an object that exists in the vicinity of a vehicle. The object identification system includes a sensor and a calculation processing device configured to analyze the output of the sensor. As such a sensor, a desired one is selected from among a camera, LiDAR (Light Detection and Ranging, Laser Imaging Detection and Ranging), millimeter-wave radar, ultrasonic sonar, etc., giving consideration to the usage, required precision, and cost.

Typical monocular cameras are not capable of acquiring depth information. Accordingly, in a case in which there is overlap between multiple objects positioned at different distances, it is difficult to separate individual objects.

As a camera that is capable of acquiring the depth information, TOF cameras are known. A TOF (Time Of Flight) camera is configured to emit infrared light by means of a light-emitting device, to measure the time of flight up to the time point at which the reflected light returns to the image sensor, and to convert the time of flight into distance information in the form of an image.

As an alternative to a TOF camera, the present applicant has proposed a gating camera (or gated camera) (Japanese Patent Application Laid Open No. 2009-257983, International Publication WO 2017/110413A1). A gating camera is configured to divide its image capture range into multiple image capture ranges, and to capture multiple images for respective ranges at different exposure timings and different exposure periods. With this, a slice image is acquired for each target image capture range. Each slice image includes only an object in the corresponding image capture range.

1. As a result of investigating gating cameras, the present inventors have come to recognize the following problem. FIGS. 1A and 1B are diagrams for explaining a problem that occurs in a gating camera. FIG. 1A shows an example of a situation in which the gating camera captures images. In a case in which the image capture range is designed to have a narrow depth, this leads to an object existing across multiple image capture ranges. FIG. 1A shows a situation in which images of an automobile are captured from the front with an image capture range depth of 1.5 m. FIG. 1B shows multiple slice images acquired in the image capture situation shown in FIG. 1A. A slice image $IMGs_i$ that corresponds to an image capture range includes only a part of the bumper or hood of the automobile. A different slice image $IMGs_{i+1}$ includes only a part of the hood or windshield of the automobile. Accordingly, it is difficult to recognize what the object is based on the individual slice images IMGs.

By increasing the depth of the image capture range to on the order of several dozen m, such an arrangement is capable of solving this problem. However, in a case in which the depth of the image capture range is excessively increased, there is a high probability that there will be a range including an object that differs from the object of interest. This degrades the advantage of the gating camera.

2. With such a gating camera, the image transmission rate from an image sensor to an image processing unit becomes a bottleneck. That is to say, the image sensor can be operated with a very high frame rate. However, the time required for the gating camera to generate slice images for all the image capture ranges (which will be referred to as the "image capture time of the gating camera") is limited by the transmission rate.

3. An active sensor such as a gating camera or the like is configured to illuminate probe light to an object, and to detect the reflected light. The active sensor mainly includes a light projector (illumination apparatus) configured to illuminate light to an object and a photosensor configured to detect the reflected light from the object. By providing matching between the wavelength of the probe light and the sensitivity wavelength range of the sensor, this allows the active sensor to have an advantage of improved resistance with respect to disturbance as compared with a passive sensor.

In a case in which there is a pulsed light source that emits light having the same wavelength as that provided by the illumination apparatus of the active sensor at a cycle that is an integer multiple or an integer fraction of the light-emission cycle of the active sensor, this drastically degrades the detection precision of the active sensor.

SUMMARY

Description will be made regarding an outline of several example embodiments of the present disclosure. In this outline, some concepts of one or more embodiments will be described in a simplified form as a prelude to the more detailed description that is presented later in order to provide a basic understanding of such embodiments. Accordingly, the outline is by no means intended to restrict the scope of the present invention or the present disclosure. Furthermore, this outline is not an extensive overview of all conceivable embodiments, and is by no means intended to restrict essential elements of the embodiments. For convenience, the term "one embodiment" may be used herein to refer to a single embodiment (example or modification) or multiple embodiments (examples or modifications) disclosed in the present specification.

SUMMARY

1. A gating camera according to an embodiment includes: an illumination apparatus structured to illuminate probe light; an image sensor; a camera controller structured to control a timing at which the illumination apparatus illuminates the probe light and a timing at which the image sensor is exposed, such that the image sensor outputs a slice image for each of image capture ranges divided in the depth direction while changing the image capture range, and such that each slice image includes only an object included in the corresponding image capture range; and an image processing unit structured to generate a final image including an entire object of interest (OOI) based on the multiple slice images that correspond to the multiple image capture ranges.

With this embodiment, this is capable of generating a final image including an entire object of interest with image capture ranges each having a small depth.

Also, the final image may include only the object of interest. With such an arrangement in which objects other than the object of interest are removed, this provides improved visibility in a case in which the final image is displayed on a display. Alternatively, this facilitates downstream processing such as object identification for the object of interest.

Also, the image processing unit may combine the multiple slice images so as to generate a combined image including distance information for each pixel, and may extract a region including the object of interest from the combined image. With such an arrangement in which the distance information provided by the intermediate image is used as a reference, this allows an object to be extracted in a simple manner.

A gating camera according to an embodiment includes: an illumination apparatus structured to illuminate probe light; an image sensor; a camera controller structured to control a timing at which the illumination apparatus illuminates the probe light and a timing at which the image sensor is exposed, such that the image sensor outputs a slice image for each of image capture ranges divided in the depth direction while changing the image capture range, and such that each slice image includes only an object included in the corresponding image capture range; and an image processing unit structured to combine the multiple slice images that correspond to the multiple image capture ranges so as to generate a combined image having distance information for each pixel.

With such an arrangement in which the distance information provided by the intermediate image is used as a reference, this allows an object to be extracted in a simple manner.

2. A gating camera according to an embodiment includes: an illumination apparatus structured to illuminate probe light; an image sensor; a camera controller structured to control a timing at which the illumination apparatus illuminates the probe light and a timing at which the image sensor is exposed, such that the image sensor outputs a slice image for each of image capture ranges divided in the depth direction while changing the image capture range, and such that each slice image includes only an object included in the corresponding image capture range; and an image processing unit structured to receive a slice image from the image sensor and to process the slice image. The camera controller is configured to be capable of adaptively controlling the data amount of the slice image transmitted from the image sensor to the image processing unit.

With such an arrangement in which the data amount of the slice image to be transmitted is reduced according to a situation, this allows the transmission time to be shortened, thereby allowing the image capture time to be reduced.

Also, the camera controller may instruct the image sensor or an interface (image transmission circuit) arranged between the image sensor and the image processing unit to crop a part of the slice image so as to reduce the size of the slice image to be transmitted. With such an arrangement in which only a necessary portion is cropped and transmitted, this allows the data amount to be reduced.

Instead of or in addition to cropping, the resolution may be reduced by binning or thinning processing so as to reduce the data amount.

An object at a near distance moves at a relatively fast speed in the slice image. In this case, in a case in which such a cropping region is determined at a given time point as a reference, there is high probability that such an object will deviate from the cropping region after the cropping region is determined. In contrast, an object at a far distance moves at a relatively slow speed in the slice image. In this case, such an object remains in the cropping region for a long period of time. Furthermore, there is a high probability that such an object at a far distance appears in a concentrated manner in the vicinity of the vanishing point. Accordingly, a slice image group that corresponds to an image capture range group that is nearer than a predetermined distance may always be transmitted without cropping. Also, whether or not the slice image is to be cropped may be controlled for a slice image group that corresponds to an image capture range group that is farther than the predetermined distance. This allows slice images including the object of interest to be transmitted.

Also, the gating camera may be configured such that multiple slice images may be transmitted without cropping. Also, whether or not multiple subsequent slice images are to be cropped may be determined based on the multiple uncropped slice images. With this, the situation of future slice images may be predicted and estimated based on the slice images that have not been cropped, so as to determine whether or not subsequent images are to be cropped.

Also, in a first mode, all slice images that correspond to all image capture ranges may be transmitted without cropping. Also, when a far-side slice image group that corresponds to an image capture range group that is farther than a predetermined distance transmitted in the first mode includes only a single object of interest, the mode may be switched to a second mode. Also, in the second mode, the far-side slice image group may be transmitted after a region of interest thereof including the object of interest is cropped.

Also, the illumination apparatus may be structured to be capable of focusing and diffusing the probe light so as to provide a variable illumination range. Also, when a slice image is to be transmitted with cropping, the camera controller may instruct the illumination apparatus to focus the probe light. In a case in which image capture is to be performed for the far-side image capture ranges, large attenuation occurs in the probe light and the reflected light thereof. Accordingly, a single exposure is insufficient for generating a slice image having sufficient brightness. In this case, the following processing is required. That is to say, exposure is executed multiple times for such a far-side image capture range. The slice images acquired for the respective exposures are combined so as to generate a single slice image. By focusing the probe light, this allows a slice image acquired in a single exposure to have an increased brightness. Such an arrangement allows the number of times the exposure is to be executed, i.e., the number of times the slice images are to be transmitted, to be reduced. This allows the image capture time to be shortened.

A gating camera according to an embodiment includes: an illumination apparatus structured to illuminate probe light, and to be capable of focusing and diffusing the probe light so as to provide a variable illumination range; an image sensor; a camera controller structured to control a timing at which the illumination apparatus illuminates the probe light and a timing at which the image sensor is exposed, such that the image sensor outputs a slice image for each of image capture ranges divided in the depth direction while changing the image capture range, and such that each slice image includes only an object included in the corresponding image capture range; and an image processing unit structured to receive the slice images from the image sensor, and to process the slice images. The camera controller controls an illumination range of the illumination apparatus based on detection results obtained by the image processing unit.

In a case in which image capture is to be performed for the far-side image capture ranges or image capture is performed in dense fog, large attenuation occurs in the probe light and the reflected light thereof. Accordingly, a single exposure is insufficient for generating a slice image having sufficient brightness. In this case, the following processing is required. That is to say, exposure is executed multiple times for such a far-side image capture range. The slice images acquired for the respective exposures are combined so as to generate a single slice image. By focusing the probe light, this allows a slice image acquired in a single exposure to have an increased brightness. Such an arrangement allows the number of times the exposure is to be executed, i.e., the number of times the slice images are to be transmitted, to be reduced. This allows the image capture time to be shortened.

Also, in a first mode, the probe light may be illuminated to an entire illumination range. Also, in the first mode, when the image processing unit detects an object of interest in the slice image that corresponds to a predetermined image capture range, the first mode may be switched to a second mode. Also, in the second mode, when an image is captured for the predetermined image capture range, the probe light may be illuminated to a region of interest including the object of interest.

An active sensor according to an embodiment includes: a light emitting apparatus structured to emit a pulsed light multiple times at non-uniform time intervals; and a photosensor structured to detect reflected light from an object at a timing in synchronization with light emission of the light emitting apparatus for every light emission.

The photosensor operates in synchronization with the operation of the light emitting apparatus included in the same active sensor. Accordingly, even in a case in which the light emission timing is changed, the reflected light from the object is incident to the photosensor at the same timing. Accordingly, the detection values of the reflected light are integrated, thereby allowing a large signal component to be acquired. In contrast, other noise light sources emit light at a timing that is asynchronous with respect to the exposure timing of the photosensor. This is capable of reducing the probability that the timing at which noise light from such a noise light source is incident to the photosensor is included in the exposure timing of the photosensor. This allows the effects of such pulsed light sources in the vicinity to be reduced.

Also, one instance of sensing including a single light emission of the light emitting apparatus and a single exposure of the photosensor may be repeatedly executed with a predetermined cycle. Also, the light emission timing of the light emitting apparatus in the predetermined cycle may be changed for each sensing.

Also, the active sensor may be structured as a gating camera structured to change a time difference between light emission and image capture for each of ranges divided in the depth direction, so as to be capable of acquiring multiple images that correspond to the multiple ranges.

Also, the active sensor may be structured as a Time Of Flight (TOF) camera.

Also, the active sensor may be structured as a LIDAR (Light Detection and Ranging, Laser Imaging Detection and Ranging).

ADVANTAGE OF THE PRESENT INVENTION

With an embodiment, this is capable of generating an image including an entire object of interest with image capture ranges having a reduced depth. With an embodiment, this allows the image capture time of the gating camera to be shortened. With an embodiment, this is capable of reducing the effects of the active sensors in the vicinity.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 8A through 8C are diagrams each showing a specific example of generating processing for generating the combined image IMGc provided by the image processing unit;

FIGS. 9A through 9C are diagrams for explaining the generation of the final image IMGf based on the combined image IMGc;

FIG. 11 is a diagram for explaining an image capture operation of the gating camera;

FIGS. 13A and 13B are diagrams for explaining image capture and transmission of the slice image;

DETAILED DESCRIPTION

Figure 1A:
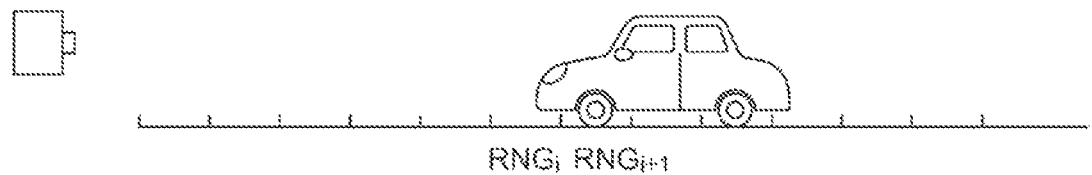
FIGS. 1A and 1B diagrams for explaining a problem that occurs in a gating camera.
Figure 1B:
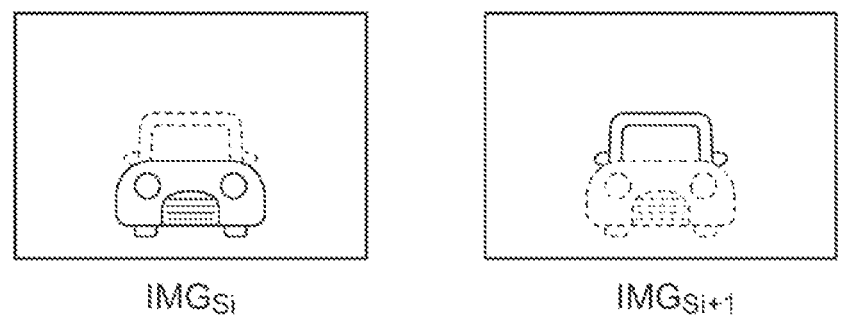

Description will be made below regarding the present invention based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

Embodiment 1

Figure 2:
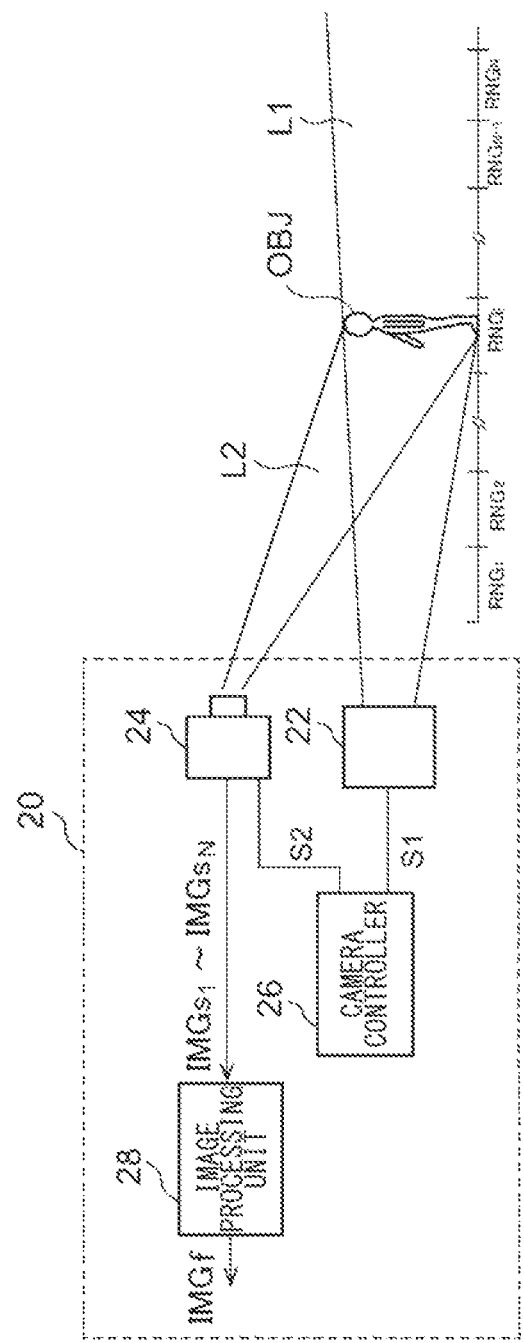
FIG. 2 is a block diagram showing a gating camera according to an embodiment 1.

FIG. 2 is a block diagram showing a gating camera 20 according to an embodiment 1. The gating camera 20 captures images for a plurality of N (N≥2) ranges $RNG_1$ through $RNG_N$ divided in the depth direction. For example, the depth of a single image capture range is designed on the order of 1 to 2 m (e.g., 1.5 m). Description will be made assuming that N=100.

The gating camera 20 includes an illumination apparatus 22, an image sensor 24, a camera controller 26, and an image processing unit 28.

The illumination apparatus 22 illuminates probe light L1 in front of the vehicle in synchronization with a light emission timing signal S1 supplied from the camera controller 26. The probe light L1 is preferably generated as infrared light. However, the present invention is not restricted to such an arrangement. Also, the probe light L1 may be visible light having a predetermined wavelength.

The image sensor 24 is configured to support exposure control in synchronization with an exposure timing signal S2 supplied from the camera controller 26, and to be capable of generating slice images IMGs. The image sensor 24 is sensitive to the same wavelength as that of the probe light L1. The image sensor 24 captures images of reflected light (returned light) L2 reflected by the object OBJ, and outputs slice images IMGs.

The camera controller 26 holds light emission timing and exposure timing determined for each of the image capture ranges $RNG_1$ through $RNG_N$. When an image is captured for a given image capture range $RNG_i$, the camera controller generates the light emission timing signal S1 and the exposure timing signal S2 based on the light emission timing and the exposure timing that correspond to the corresponding image capture range, and captures images. The i-th slice image $IMGs_i$ includes an object included in the corresponding image capture range $RNG_i$.

In the present embodiment, the camera controller 26 captures images while changing the image capture range $RNG_i$ in the depth direction, so as to generate the slice images $IMGs_1$ through $IMGs_N$ for all the image capture ranges $RNG_1$ through $RNG_N$.

Figure 3:
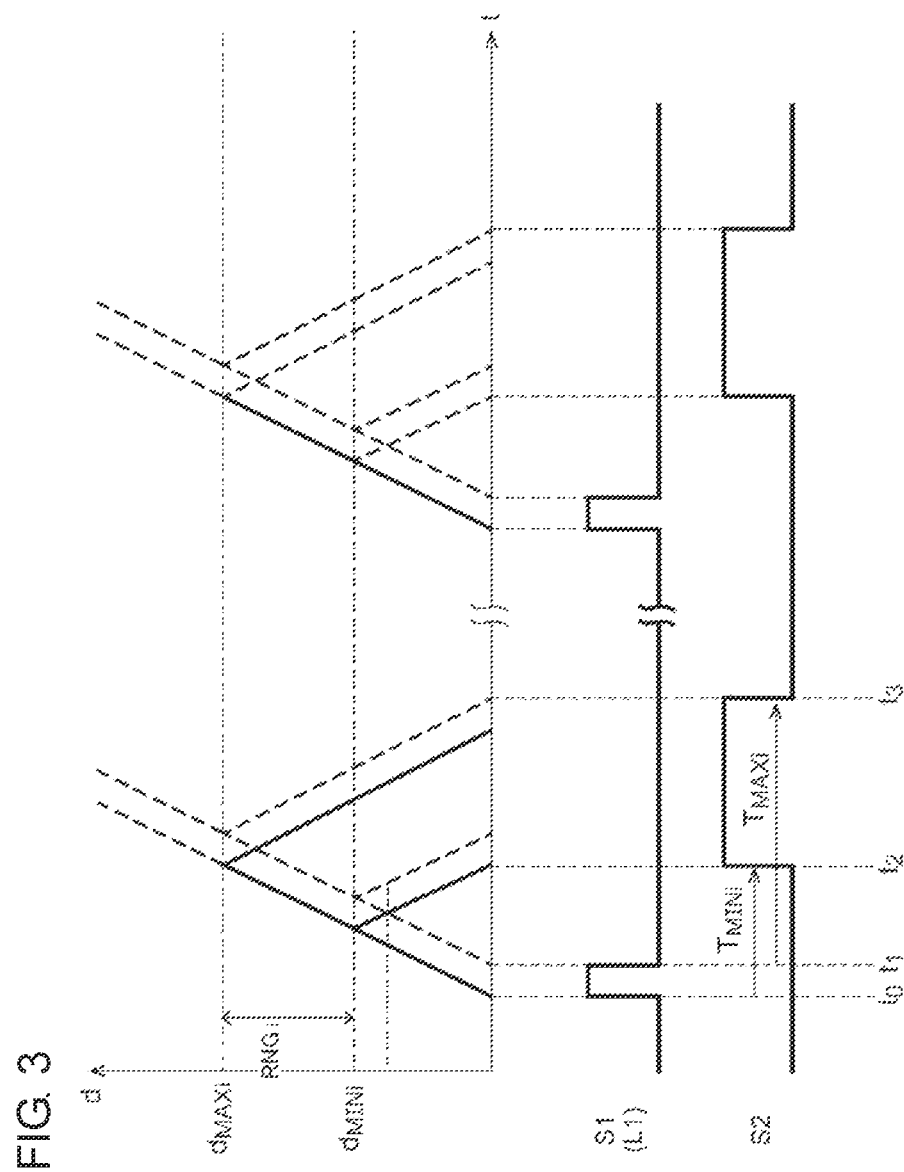
FIG. 3 is a diagram for explaining an image capture operation of the gating camera.

FIG. 3 is a diagram for explaining the image capture operation of the gating camera 20. FIG. 3 shows the operation when the i-th image capture range $RNG_i$ is measured as the range of interest (ROI). The illumination apparatus emits light during a light-emitting period $\tau_1$ from the time point $t_0$ to $t_1$ in synchronization with the light emission timing signal S1. In the upper diagram, a light beam diagram is shown with the horizontal axis as time and with the vertical axis as distance. The distance between the gating camera 20 and the near-distance boundary of the image capture range $RNG_i$ is represented by $d_{MINi}$. The distance between the gating camera 20 and the far-distance boundary of the image capture range $RNG_i$ is represented by $d_{MAXi}$.

The round-trip time $T_{MINi}$, which is a period from the departure of light from the illumination apparatus 22 at a given time point, to the arrival of the light at the distance $d_{MINi}$, up to the return of the reflected light to the image sensor 24, is represented by $T_{MINi}=2\times d_{MINi}/c$. Here, c represents the speed of light.

Similarly, the round-trip time $T_{MAXi}$, which is a period from the departure of light from the illumination apparatus 22 at a given time point, to the arrival of the light at the distance $d_{MAXi}$, up to the return of the reflected light to the image sensor 24, is represented by $T_{MAXi}=2\times d_{MAXi}/c$.

When only an image of an object OBJ included in the image capture range $RNG_i$ is to be captured, the camera controller 26 generates the exposure timing signal S2 so as to start the exposure at the time point $t_2=t_0+T_{MINi}$, and so as to end the exposure at the time point $t_3=t_1+T_{MAXi}$. This is a single exposure operation.

When an image is captured for the i-th range $RNG_i$, the exposure may be executed multiple times (multiple exposures). In this case, preferably, the camera controller 26 may repeatedly execute the above-described exposure operation multiple times with a predetermined period $\tau_2$.

Returning to FIG. 2, the image processing unit 28 receives the input of multiple slice images $IMGs_1$ through $IMGs_N$ that correspond to the multiple image capture ranges $RNG_1$ through $RNG_N$. The image processing unit 28 generates a single final image IMGf including an object of interest (OOI) based on the multiple slice images $IMGs_1$ through $IMGs_N$.

The above is the configuration of the gating camera 20. Next, description will be made regarding the operation thereof.

Figure 4:
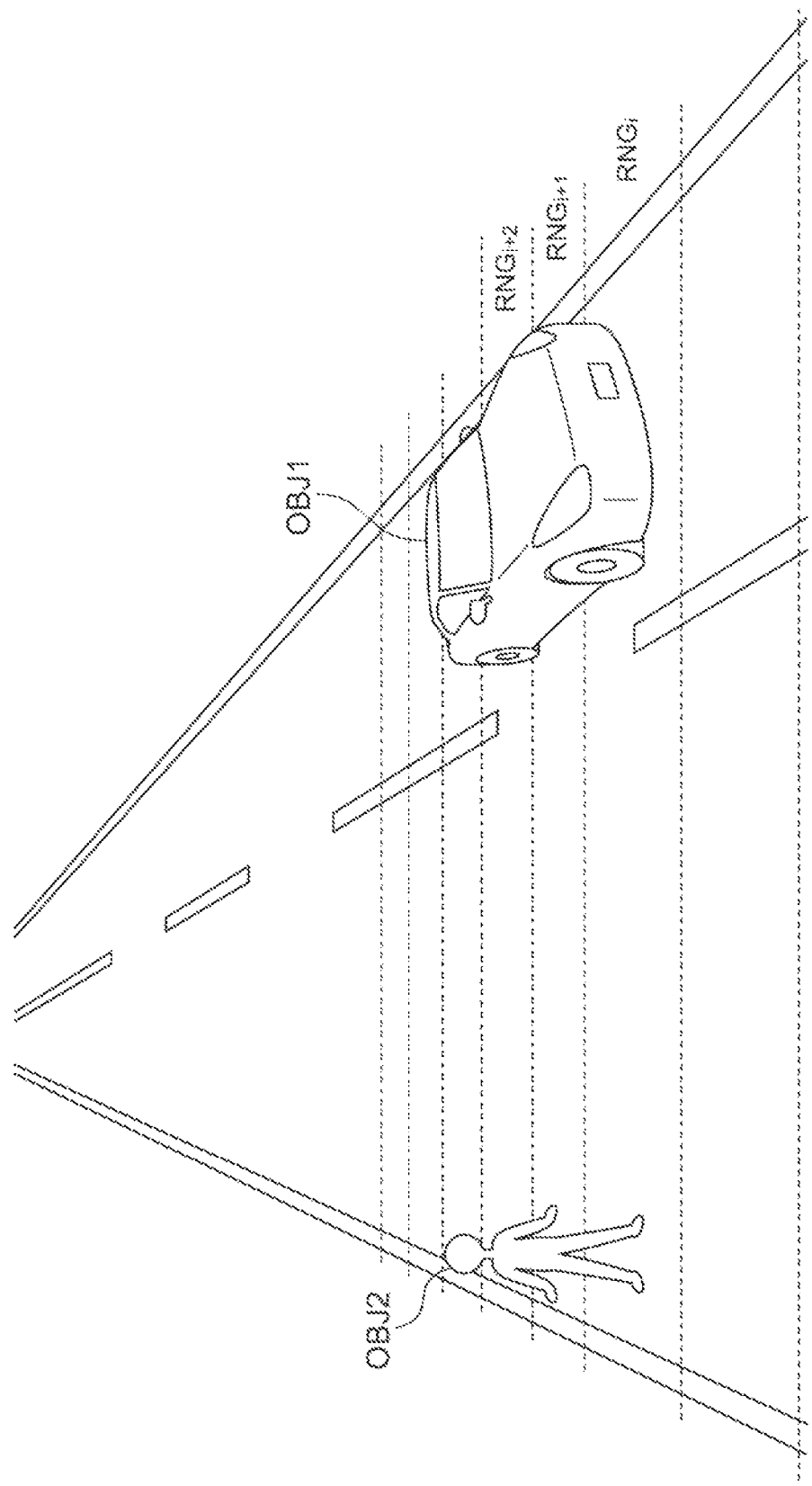
FIG. 4 is a diagram showing an example of an image capture situation.

FIG. 4 is a diagram showing an example of an image capture situation. A vehicle OBJ1 and a pedestrian OBJ2 are in front of the gating camera 20. The vehicle OBJ1 exists across multiple image capture ranges $RNG_i$ through $RNG_{i+2}$. The pedestrian OBJ2 is included in the image capture range $RNG_i$.

Figure 5:
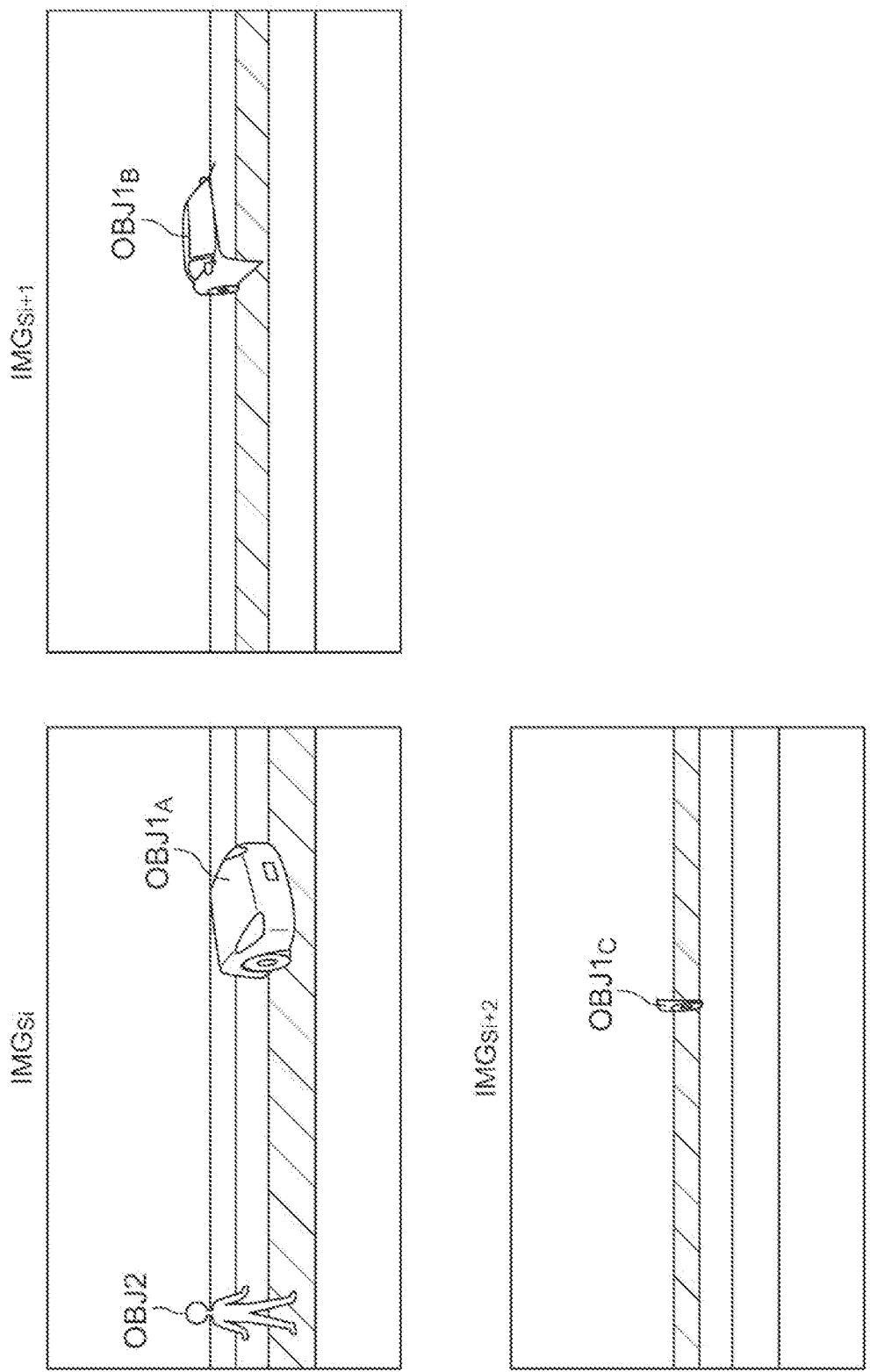
FIG. 5 is a diagram showing three slice images $IMGs_i$ through $IMGs_{i+2}$ from among all the slices $IMGs_1$ through $IMGs_N$ acquired in the driving situation shown in FIG. 4.

FIG. 5 is a diagram showing three slice images $IMGs_i$ through $IMGs_{i+2}$ from among all the slice images $IMGs_1$ through $IMGs_N$ acquired in the driving situation shown in FIG. 4. Each slice image $IMGs_i$ includes only an object included in the corresponding image capture range $RNG_i$. Accordingly, the slice image $IMGs_i$ includes the pedestrian 2 and a part of the vehicle OBJ1, i.e., a portion $OBJ1_A$. The slice image $IMGs_{i+1}$ includes a portion $OBJ1_B$ of the vehicle OBJ1. The slice image $IMGs_{i+2}$ includes a portion $OBJ1_C$ of the vehicle OBJ1.

Figure 6:
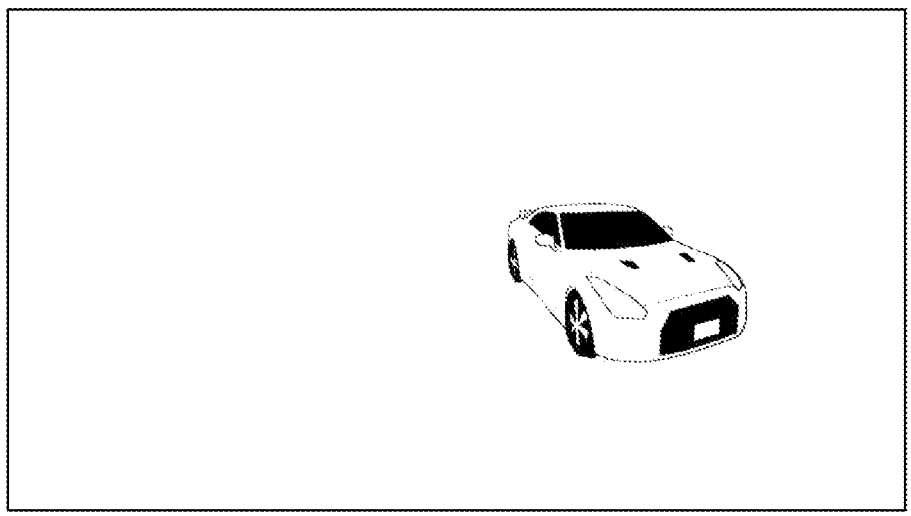
FIG. 6 is a diagram showing a final image IMGf generated by an image processing unit.

For example, the image processing unit 28 scans all the slice images $IMGs_1$ through $IMGs_N$, and sets a candidate of an object of interest included in the slice images. In this example, when the image processing unit 28 detects a part of a vehicle included in the slice image $IMGs_i$, the vehicle is set to an object of interest. Subsequently, all the slice images $IMGs_1$ through $IMGs_N$ are scanned again, and detects the slice images $IMGs_{i+1}$ and $IMGs_{i+2}$ including different parts of the same vehicle OBJ1, i.e., portions $OBJ1_B$ and $OBJ1_C$. The portions $OBJ1_A$ through $OBJ1_C$, which form the same object of interest, are extracted from the slice images $IMG_{si}$ through $IMGs_{i+2}$, and are combined. FIG. 6 is a diagram showing a final image IMGf generated by the image processing unit 28. It should be noted that the final image IMGf does not include the pedestrian OBJ2, which has not been set to an object of interest.

The above is the operation of the gating camera 20. With the gating camera 20, this is capable of extracting an object of interest, and of generating a final image IMGf including the whole of the object of interest thus extracted with a reduced depth of the image capture ranges RNG.

The gating camera 20 has an advantage of being capable of removing objects other than the object of interest from the final image. In particular, this advantage is effectively provided under particular situations such as a snowfall situation or the like in addition to the image capture situation as shown in FIG. 4. In such a snowfall situation, each slice image includes a great number of small snowflakes. With the gating camera 20, this allows such snowflakes to be removed from the final image IMGf, thereby generating an image with high visibility.

Next, description will be made regarding a specific example of the processing provided by the image processing unit 28. In a step of generating the final image IMGf, the image processing unit 28 may generate a combined image IMGc, and may generate the final image IMGf based on the combined image IMGc.

Figure 7:
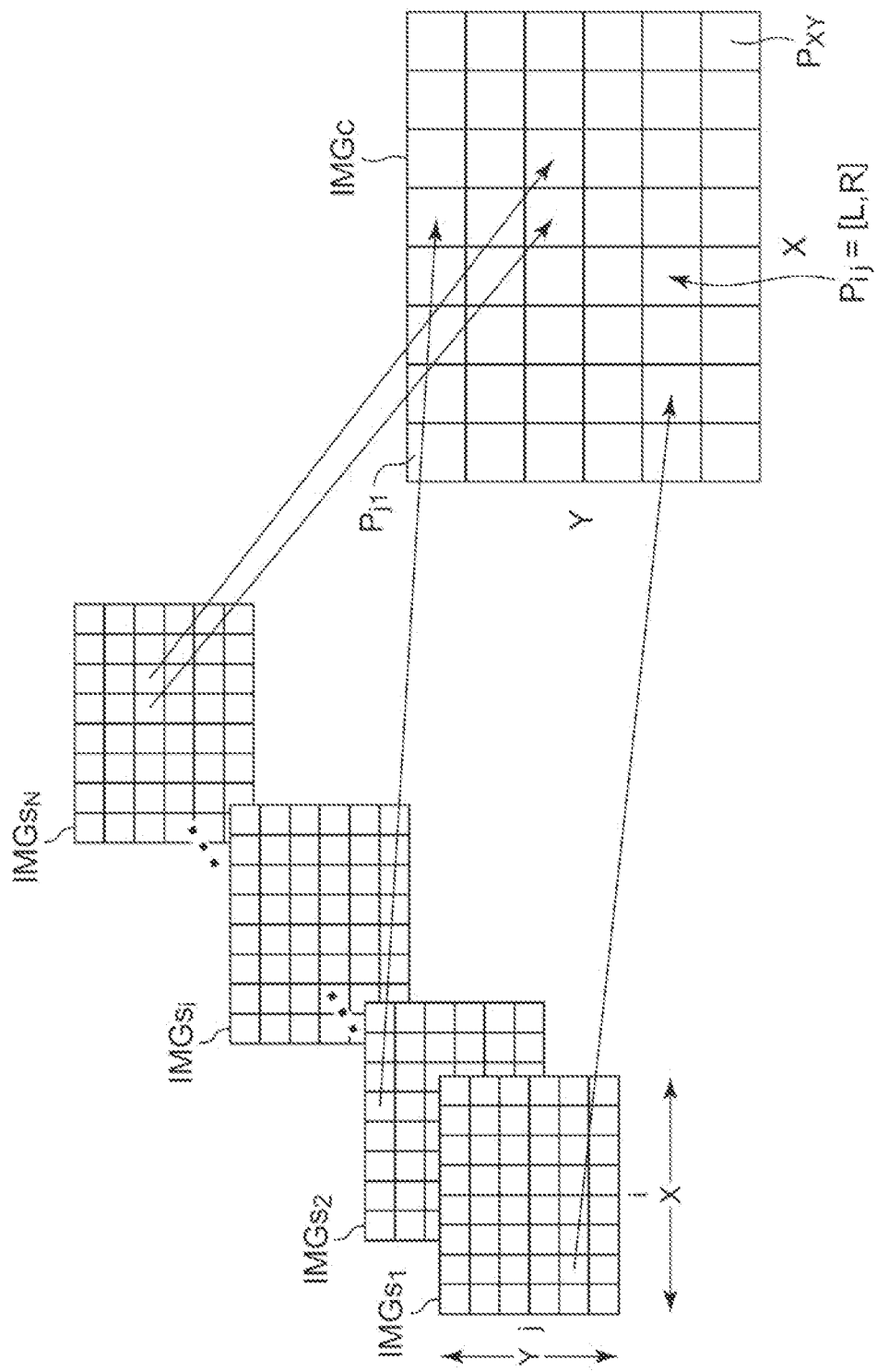
FIG. 7 is a diagram for explaining a combined image IMGc generated by the image processing unit.

FIG. 7 is a diagram for explaining the combined image IMGc generated by the image processing unit 28. The slice images IMGs and the intermediate image IMGc each have X×Y pixels. The pixel of the j-th row and i-th column will be represented by $P_{ij}$. The intermediate image IMGc is an image obtained by combining all the slice images $IMGs_1$ through $IMGs_N$. Each pixel $P_{ij}$ of the intermediate image IMGc has a brightness value L that corresponds to one slice image $IMGs_k$ (k=1 to N) from among all the slice images $IMGs_1$ through $IMGs_N$, or a brightness value L' obtained by calculating the brightness value L. Furthermore, each pixel $P_{ij}$ of the intermediate image IMGc has an identifier (k in this example) of the slice image $IMGs_k$ that indicates the origin of the brightness value thereof. The identifier k can be regarded as distance information to the object. Accordingly, instead of the identifier k, each pixel $P_{ij}$ of the intermediate image IMGc may include the distance d to the object that indicates the origin of the pixel. In the present specification, each pixel $P_{ij}$ is represented in the form of [L, k].

It should be noted that the format of the intermediate image IMGc is not restricted in particular. For example, the intermediate image IMGc may include two items of image data, i.e., X×Y image data that represents brightness value information and X×Y image data that represents distance information.

FIGS. 8A through 8C are diagrams showing a specific example of the processing for generating the combined image IMGc provided by the image processing unit 28. For ease of understanding, description will be made regarding an arrangement in which N=6 and each pixel has eight gradations (3 bits) from 0 to 7. FIG. 8A shows multiple slice images $IMGs_1$ through $IMGs_6$ that correspond to all the image capture ranges.

The combining method is not restricted in particular. Description will be made below regarding an example of the combining method.

FIG. 8B shows the intermediate image IMGc obtained by a first generating method. In the first generating method, each pixel $P_{ij}$ of the intermediate image IMGc has a brightness value that is the maximum value (or a value obtained by calculating the maximum value) from among the brightness values of the corresponding pixels $P_{ij}$ of all the slice images $IMGs_1$ through $IMGs_6$.

FIG. 8C shows an intermediate image IMGc obtained by a second generating method. In the second generating method, each pixel $P_{ij}$ of the intermediate image IMGc has a brightness value that is a value selected from among effective brightness values of the corresponding pixels $P_{ij}$ of all the slice images $IMGs_1$ through $IMGs_6$ (or a value obtained by calculating the brightness value thus selected) such that it is selected from the nearest slice image (i.e., from the slice image at the nearest distance). The effective value may be defined as a non-zero value. Also, the effective value may be defined as a value that is larger than a predetermined threshold value.

Figures 9A, 9B, 9C:
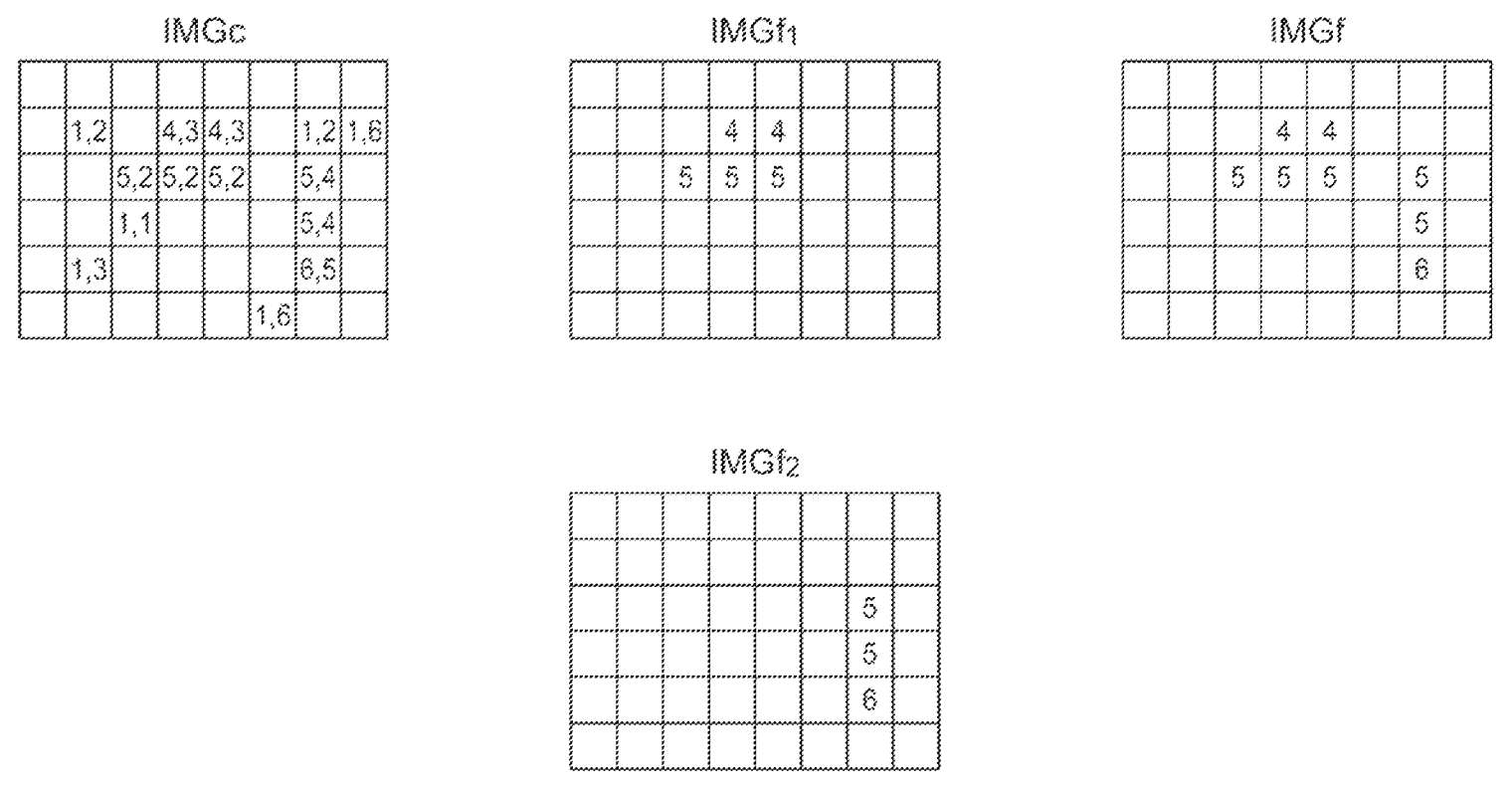

The above is the description of the combined image IMGc. FIGS. 9A through 9C are diagrams for explaining the generation of the final image IMGf based on the combined image IMGc.

The combined image IMGc includes the identifier k that represents the distance to the object in addition to the brightness value L. This allows the object of interest OOI to be extracted in a simple manner. The reason is as follows. That is to say, when there is a large difference in the identifier k between given pixels, there is a high probability that the pixels belong to different objects. Conversely, when there is a small difference in the identifier k between given pixels, there is a high probability that the pixels belong to the same object. The object extraction processing algorithm can be created based on this assumption.

When the combined image IMGc includes multiple objects of interest $OOI_1$ and $OOI_2$, as shown in FIG. 9B, the final images $IMGf_1$ and $IMGf_2$ may be generated for the respective objects of interest.

Alternatively, when the combined image IMGc includes multiple objects of interest $OOI_1$ and $OOI_2$, as shown in FIG. 9C, a single final image IMGf including the multiple objects of interest may be generated.

After the combined image IMGc is generated, the data of the multiple original slice images $IMGc_1$ through $IMGc_N$ may be discarded. This also provides an advantage of allowing the memory capacity to be reduced.

Embodiment 2

Figure 10:
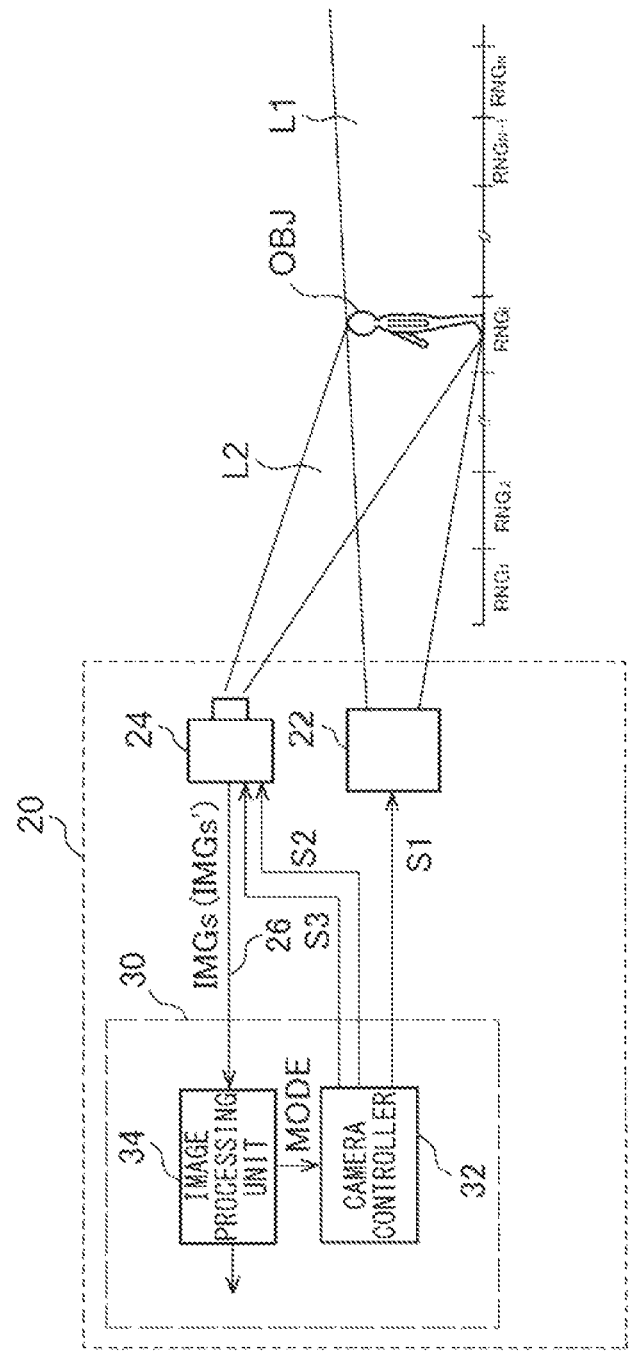
FIG. 10 is a block diagram showing a gating camera according to an embodiment 2.

FIG. 10 is a block diagram showing a gating camera 20 according to an embodiment 2. The gating camera 20 captures images for a plurality of N (N≥2) ranges $RNG_1$ through $RNG_N$ divided in the depth direction. For example, the depth d of a single image capture range is designed on the order of 1 to 2 m (e.g., 1.5 m). Description will be made assuming that N=100.

The gating camera 20 includes an illumination apparatus 22, an image sensor 24, a camera controller 32, and an image processing unit 34.

The illumination apparatus 22 illuminates probe light L1 in front of the vehicle in synchronization with a light emission timing signal S1 supplied from the camera controller 32. The probe light L1 is preferably generated as infrared light. However, the present invention is not restricted to such an arrangement. Also, the probe light L1 may be visible light having a predetermined wavelength.

The image sensor 24 is configured to support exposure control in synchronization with an exposure timing signal S2 supplied from the camera controller 32, and to be capable of generating slice images IMGs. The image sensor 24 is sensitive to the same wavelength as that of the probe light L1. The image sensor 24 captures images of reflected light (returned light) L2 reflected by the object OBJ, and outputs slice images IMGs.

The camera controller 32 holds light emission timing and exposure timing determined for each of the image capture ranges $RNG_1$ through $RNG_N$. When an image is captured for a given image capture range $RNG_i$, the camera controller 32 generates the light emission timing signal S1 and the exposure timing signal S2 based on the light emission timing and the exposure timing that correspond to the corresponding image capture range, and captures images. The i-th slice image $IMGs_i$ includes an object included in the corresponding image capture range $RNG_i$.

In the present embodiment, the camera controller captures images while changing the image capture range $RNG_i$ in the depth direction, so as to generate the slice images $IMGs_i$ through $IMGs_N$ for all the image capture ranges $RNG_1$ through $RNG_N$.

FIG. 11 is a diagram for explaining the image capture operation of the gating camera 20. FIG. 11 shows the operation when the i-th image capture range $RNG_i$ is measured. The illumination apparatus 22 emits light during a light-emitting period $\tau_1$ from the time point $t_0$ to $t_1$ in synchronization with the light emission timing signal S1. In the upper diagram, a light beam diagram is shown with the horizontal axis as time and with the vertical axis as distance. The distance between the gating camera 20 and the near-distance boundary of the image capture range $RNG_i$ is represented by $d_{MINi}$. The distance between the gating camera 20 and the far-distance boundary of the image capture range $RNG_i$ is represented by The round-trip time $T_{MINi}$, which is a period from the departure of light from the illumination apparatus 22 at a given time point, to the arrival of the light at the distance $d_{MINi}$, up to the return of the reflected light to the image sensor 24, is represented by $T_{MINi}=2 \times T_{MINi}/c$. Here, c represents the speed of light.

Similarly, the round-trip time $T_{MAXi}$, which is a period from the departure of light from the illumination apparatus 22 at a given time point, to the arrival of the light at the distance $d_{MAXi}$, up to the return of the reflected light to the image sensor 24, is represented by $T_{MAXi}=2 \times d_{MAXi}/c$.

When only an image of an object OBJ included in the image capture range $RNG_i$ is to be captured, the controller 32 generates the exposure timing signal S2 so as to start the exposure at the time point $t_2=t_0+T_{MINi}$, and so as to end the exposure at the time point $t_3=t_1+T_{MAXi}$. This is a single exposure operation.

When an image is captured for the i-th range $RNG_i$, the exposure may be executed multiple times (multiple exposures). In this case, preferably, the camera controller may repeatedly execute the above-described exposure operation multiple times with a predetermined period $\tau_2$.

Returning to FIG. 10, the image processing unit 34 receives the slice images $IMGs_i$ (i=1, 2, . . . , N) from the image sensor 24, and processes the slice images $IMGs_i$ thus received.

The camera controller 32 and the image processing unit 34 may be provided as separate hardware components. Otherwise, they may be configured as a single hardware component. For example, the camera controller 32 and the image processing unit 34 may be provided as a combination of a calculation processing device 30 such as a microcontroller or the like and a software component to be executed by the calculation processing device 30.

The image sensor 24 and the calculation processing device 30 are coupled via an interface 26. The interface 26 transmits the slice images IMGs from the image sensor 24 to the image processing unit 34. The kind of the interface 26 is not restricted in particular. Examples of such an interface to be employed as the interface 26 include Mobile Industry Processing Interface (MIPI), Universal Serial Bus (USB), etc.

In the present embodiment, the camera controller 32 is configured to be capable of controlling at least one from among the image sensor 24 and the interface 26, so as to adaptively control the data amount of each slice image IMGs transmitted from the image sensor 24 to the image processing unit 34.

In the present embodiment, the camera controller 32 instructs the image sensor 24 or the interface 26 to crop a portion of the slice image IMGs so as to reduce the size (number of pixels) of the slice image IMGs thus transmitted, thereby reducing the data amount. The camera controller 32 generates a control signal S3 that specifies whether or not the slice image is to be cropped. The control signal S3 may include information on the size or the position of the region to be cropped.

The cropping method is not restricted in particular. In the image sensor 24, a portion of the slice image IMGs may be cropped. That is to say, the image itself to be read out by the image sensor 24 may be cropped. Alternatively, in the interface 26, a portion of the slice image IMGs may be cropped. That is to say, after all the pixels are read out from the image sensor 24, a portion of the full-size image thus read out may be cropped.

Figure 12A:
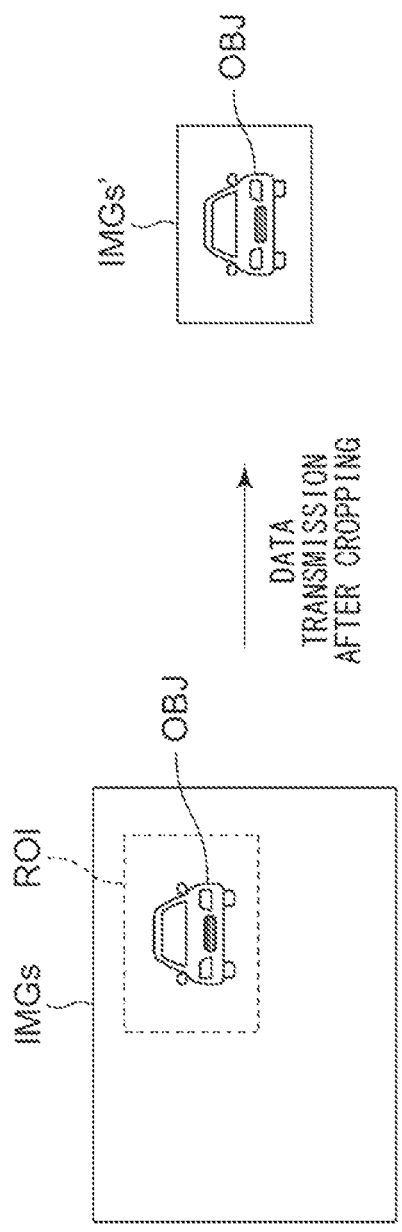
FIGS. 12A and 12B are diagrams for explaining an example of cropping processing for cropping the slice image IMGs.
Figure 12B:
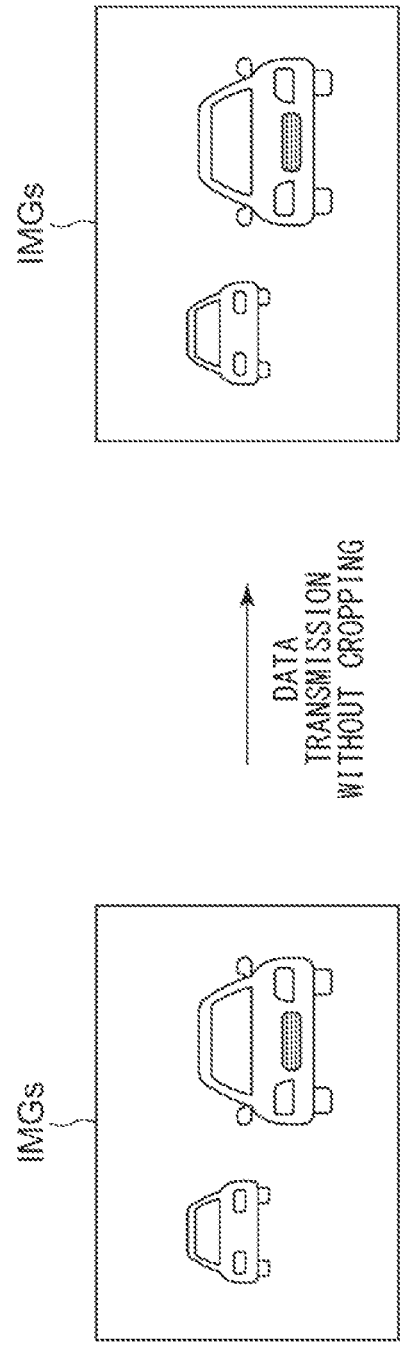

FIGS. 12A and 12B are diagrams for explaining an example of the cropping processing for the slice image IMGs. As shown in FIG. 12A, when there is a high probability that only a part of the slice image IMGs obtained by the image sensor 24 includes an object OBJ, such a region (region of interest ROI) including the object OBJ is cropped, and the cropped slice image (cropped image) IMGs' is transmitted.

As shown in FIG. 12B, when there is a high probability that a single object exists or multiple objects exist over a wide region of the slice image IMGs obtained by the image sensor 24, the original slice image IMGs is transmitted without cropping.

An object at a near distance moves at a relatively fast speed in the slice image. In this case, in a case in which such a cropping region is determined at a given time point as a reference, there is high probability that such an object will deviate from the cropping region after the cropping region is determined. In order to solve such a problem, in the present embodiment, a slice image that corresponds to a near distance is always transmitted without cropping. This prevents the loss of such an object.

In contrast, an object at a far distance moves at a relatively slow speed in the slice image. In this case, such an object remains in the cropping region for a long period of time. Furthermore, there is a high probability that such an object at a far distance appears in a concentrated manner in the vicinity of the vanishing point.

Accordingly, in the present embodiment, the slice image group $IMGs_1$ through $IMGs_Y$ that corresponds to an image capture range group (10 to 100 m) that is nearer than a predetermined distance (e.g., 100 m) may always be transmitted as it is without cropping. In contrast, judgment may be made regarding whether or not cropping is to be executed for the slice image group $IMGs_{Y+1}$ through $IMGs_N$ that corresponds to an image capture range group (100 to 150 m) that is farther than a predetermined distance (e.g., 100 m).

It should be noted that the calculation processing device 30 is not able to monitor the slice image IMGs acquired by the image sensor 24 before transmission. Accordingly, with the present embodiment, the camera controller 32 is required to estimate the state of the current slice image IMGs based on a slice image IMGs previously received by the image processing unit 34 without cropping, so as to judge whether or not cropping is to be executed.

Accordingly, the gating camera 20 transmits all the slice images $IMGs_1$ through $IMGs_N$ without cropping. Subsequently, judgment may be made based on the slice image group $IMGs_1$ through $IMGs_N$ that has not been cropped regarding whether or not cropping is to be executed for the subsequent slice image group $IMGs_1$ through $IMGs_N$. This is capable of predicting and estimating the state of slice images that will be acquired in the future based on the slice images that have not been cropped. This allows judgment to be made regarding whether or not the further slice image is to be cropped. In this case, the position and the size of the cropping region may be determined in addition to the determination of whether or not the cropping is to be executed.

The above is the basic configuration of the gating camera 20. Next, description will be made regarding the operation thereof.

FIGS. 13A and 13B are diagrams for explaining image capture and transmission of the slice images. FIG. 13A shows an operation in which the entire region of each slice image captured by the image sensor 24 is transmitted as it is for all the image capture ranges.

FIG. 13B shows an operation in which a part of the slice image IMGs captured by the image sensor 24 is cropped and the slice image IMGs' thus cropped is transmitted for at least one image capture range RNG. The data amount of the slice image IMGs' thus cropped is smaller than that of the slice image IMGs before cropping, thereby reducing the transmission time.

The above is the operation of the gating camera 20. Next, description will be made regarding an advantage thereof. The image capture time of the gating camera 20 can be regarded as the sum total of the exposure time and the transmission time of the slice images for all the image capture ranges. With the gating camera 20, the data amount of the slice image IMGs to be transmitted from the image sensor 24 to the image processing unit 34 is reduced according to the situation. This allows the transmission time to be reduced, thereby allowing the image capture time of the gating camera 20 to be reduced.

In particular, by cropping a part of the slice image, this reduces the size of the slice image. With such an arrangement in which only a necessary portion is cropped and transmitted, this allows the data amount to be reduced. Instead of cropping, such an arrangement may employ pixel binning or pixel thinning so as to reduce the data amount. However, in such a case, this degrades the resolution of the slice image to be input to the image processing unit 34. Accordingly, this has the potential to cause a problem of degraded precision of object recognition processing in a downstream stage. In contrast, with such an arrangement employing the cropping, this does not involve degradation of the resolution. Accordingly, there is no need for concern regarding degradation of the precision of the object recognition.

Next, description will be made regarding a specific example of the control operation with and without cropping.

The gating camera 20 is configured to be switchable between a first mode and a second mode. In the first mode, all the slice images $IMGs_1$ through $IMGs_N$ that correspond to all the image capture ranges $RNG_1$ through $RNG_N$ are transmitted without cropping. In the second mode, the slice image group $IMGs_1$ through $IMGs_Y$ that corresponds to the near-distance image capture ranges $RNG_1$ through $RNG_Y$ are transmitted without cropping. In contrast, the slice image group $IMGs_{Y+1}$ through $IMGs_N$ that corresponds to the far-distance image capture ranges $RNG_{Y+1}$ through $RNG_N$ are cropped and transmitted.

Judgment of whether or not the mode is to be switched to the second mode is made based on the far-side slice image group $IMGs_{Y+1}$ through $IMGs_N$ that corresponds to the image capture ranges $RNG_{Y+1}$ through $RNG_N$, which are farther than a predetermined distance, from among the multiple slice images $IMGs_1$ through $IMGs_N$ transmitted in the first mode. Specifically, when the far-side slice image group $IMGs_{Y+1}$ through $IMGs_N$ includes only a single object of interest, the mode is switched to the second mode. In the second mode, a portion including the object of interest is set to the region of interest, and only the portion of interest is cropped and transmitted.

Figure 14:
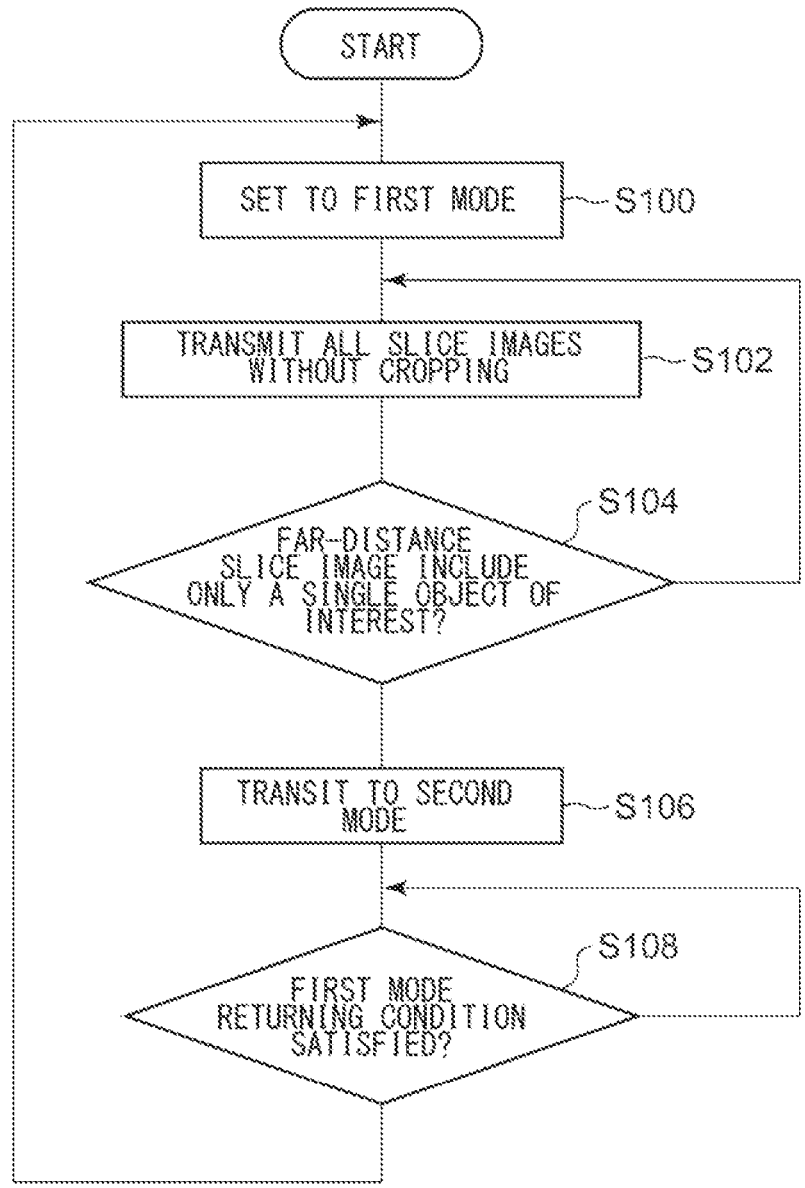
FIG. 14 is a flowchart showing an example of mode control provided by the gating camera.

FIG. 14 is a flowchart showing an example of the mode control operation of the gating camera 20. First, the mode is set to the first mode (S100). As described above, in the first mode, all the slice images $IMGs_1$ through $IMGs_N$ are input to the image processing unit 34 (S102).

When the far-side slice image group $IMGs_{Y+1}$ through $IMGs_N$ includes only a single object of interest (OOI) (YES in S104), the image processing unit 34 switches the gating camera 20 to the second mode (S106). Otherwise (NO in S104), the first mode is maintained, and the flow returns to Step S102.

For example, in Step S104, when the image processing unit 34 detects an object of interest in the far-distance slice image group IMGs, the image processing unit 34 may calculate the position of the object of interest. When judgment is made that there is no object other than the object of interest in the far-distance image capture ranges $RNG_{Y+1}$ through $RNG_N$, the mode may be switched to the second mode.

Figure 15:
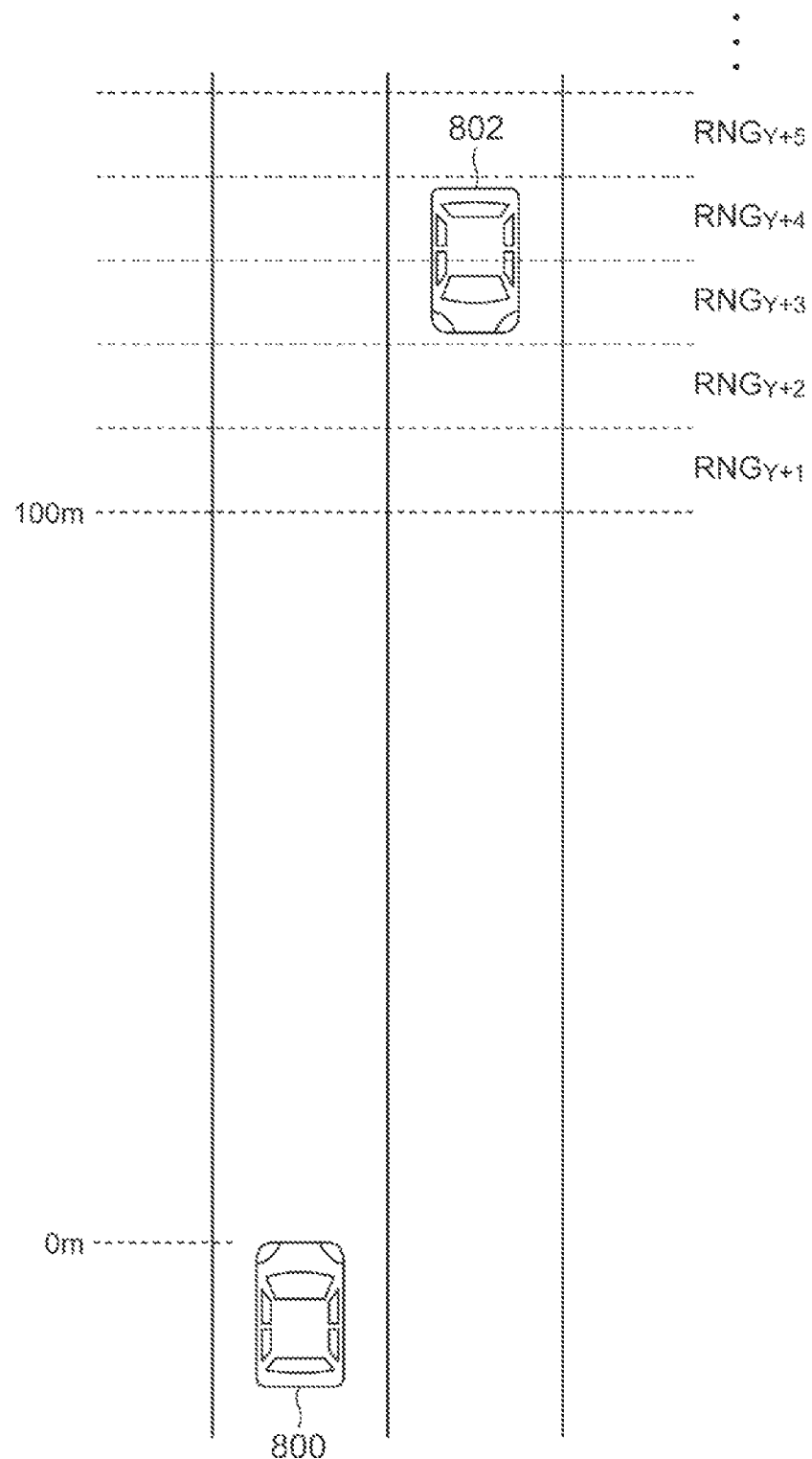
FIG. 15 is a diagram showing an example of a situation in which the mode is switched to a second mode.

FIG. 15 is a diagram showing an example of a situation in which the mode is switched to the second mode. The gating camera 20 is mounted on a vehicle 800. An oncoming vehicle 802 exists in front of the vehicle 800. The oncoming vehicle 802 is an object of interest that exists in the far-side ranges $RNG_{Y+1}$ through $RNG_N$. There is no object of interest other than the oncoming vehicle 802 in the far-side ranges $RNG_{Y+1}$ through $RNG_N$. When the gating camera 20 detects such a situation, the gating camera 20 transits to the second mode.

Returning to FIG. 14, when the mode is switched to the second mode (S106), the size and the position of the ROI including the object of interest thus detected in Step S104 are determined. During the second mode, the ROI is cropped for the far-side slice image group $IMGs_{Y+1}$ through $IMGs_N$. The slice images $IMGs_{Y+1}$ through $IMGs_N$ each including the region of interest ROI are transmitted.

It should be noted that, as described above, even in the second mode, the near-distance slice images $IMGs_1$ through $IMGs_Y$ are each transmitted in the original size without cropping.

During a period in which a first mode returning condition is not satisfied (NO in S108), the second mode is maintained. Conversely, when the first mode returning condition is satisfied (YES in S108), the mode is returned to the first mode S100.

The first mode returning condition may be the passage of a predetermined period of time. Also, when multiple objects of interest exist in the far-distance image capture ranges $RNG_{Y+1}$ through $RNG_N$, judgment may be made that the first mode returning condition is fulfilled. Also, when the original object of interest disappears from the far-distance image capture ranges RNG, judgment may be made that the first mode returning condition is fulfilled.

Embodiment 3

Figure 16:
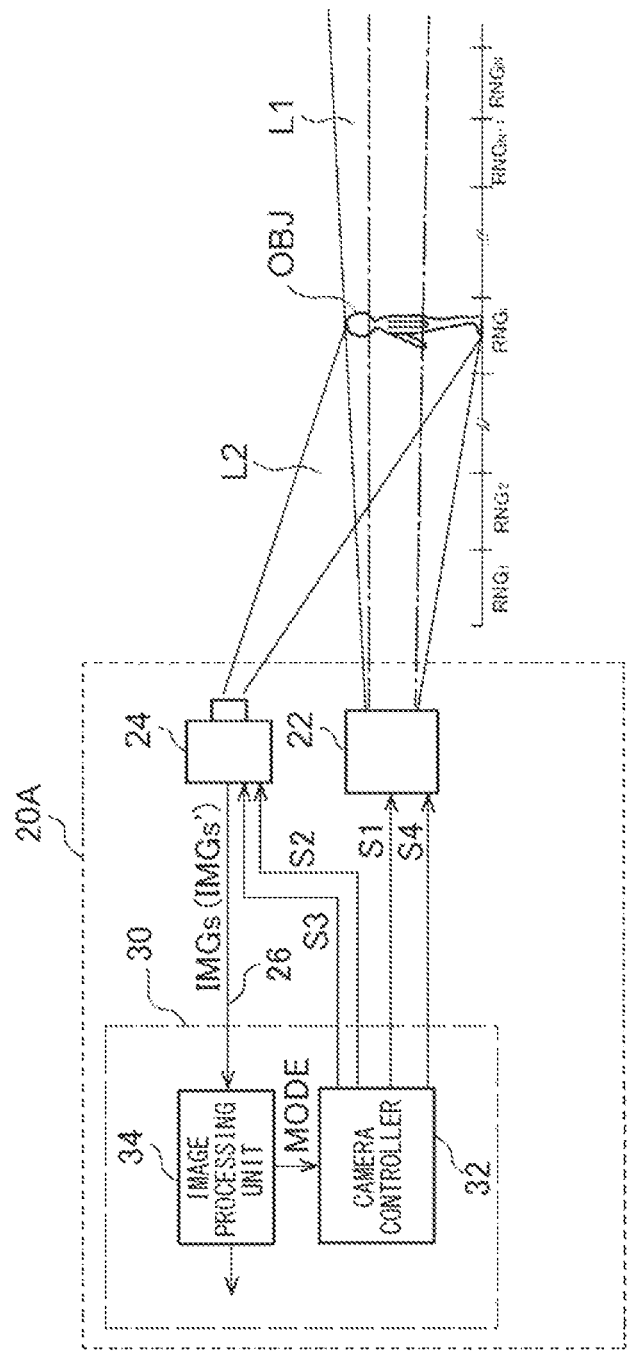
FIG. 16 is a block diagram showing a gating camera according to an embodiment 3.

FIG. 16 is a block diagram showing a gating camera 20A according to an embodiment 3. In the gating camera 20A, the illumination apparatus 22 is configured to focus or diffuse the probe light L1 so as to provide a variable illumination range. The camera controller 32 is configured to be capable of adaptively controlling the illumination range of the illumination apparatus 22 according to a control signal S4.

When the slice images IMGs to be cropped and transmitted are captured, the camera controller 32 instructs the illumination apparatus 22 to focus the probe light L1 so as to narrow the illumination range.

For example, when the far-distance slice image group through $IMGs_N$ is to be captured in the second mode, the camera controller 32 focuses the probe light L1 so as to illuminate the probe light L1 in a concentrated manner to the region of interest. This allows the illuminance of the illumination range to be raised, thereby allowing a clear image to be acquired.

The above is the configuration of the gating camera 20A. Next, description will be made regarding the advantage thereof.

In the image capture in the far-side image capture ranges, the amount of attenuation of the probe light L1 and the reflected light L2 thereof becomes large. In some cases, this leads to a problem in that slice images IMGs having sufficient brightness cannot be generated in a single exposure. In this case, when image capture is executed for the far-side image capture range, it is necessary to perform exposure multiple times, and multiple slice images acquired for the respective multiple exposures are combined so as to generate a single slice image. With the present embodiment, the probe light L1 is focused, thereby allowing the slice images IMGs to be generated with increased brightness by a single exposure. With this, the number of exposures to be executed can be reduced. That is to say, this allows the number of transmissions of slice images to be reduced. This allows the image capture time to be shortened.

Embodiment 4

Figure 17:
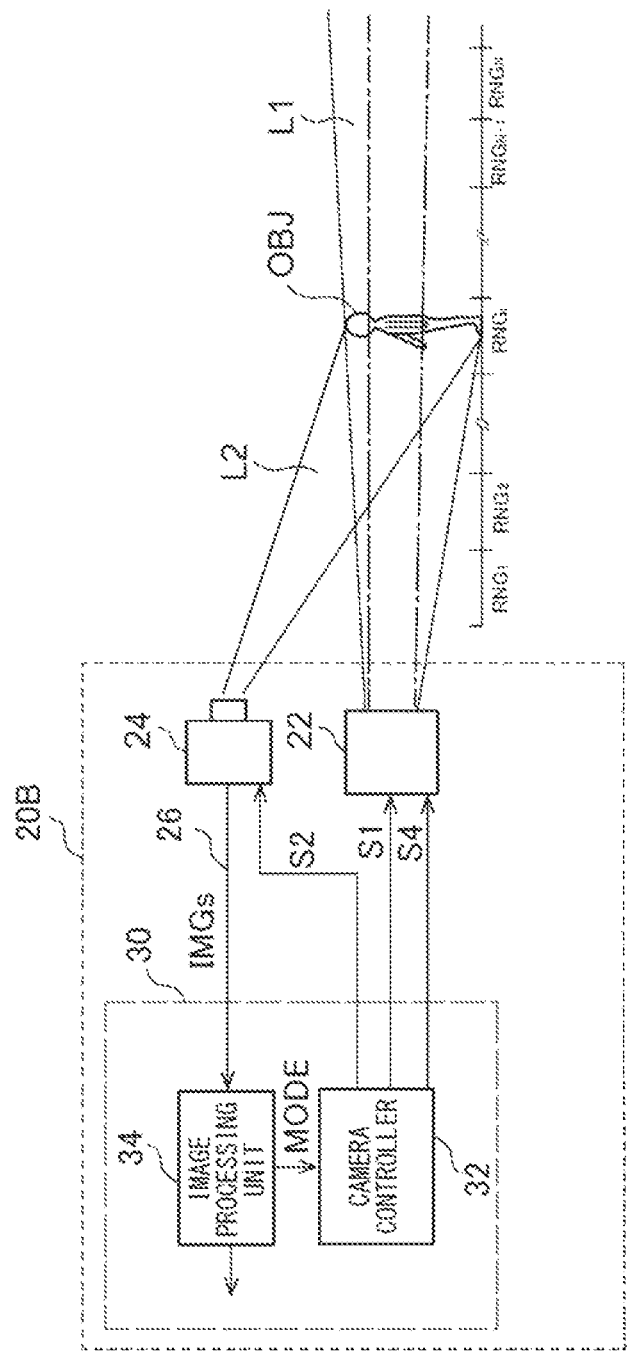
FIG. 17 is a block diagram showing a gating camera according to an embodiment 4.

FIG. 17 is a block diagram showing a gating camera 20B according to an embodiment 4. In the gating camera 20B, only the illumination range of the illumination apparatus 22 is controlled. That is to say, the slice image to be transmitted is not cropped. The control of the illumination apparatus 22 is the same as in the embodiment 3. With the gating camera 20B, this is capable of reducing the number of times exposure is to be performed for the far-side image capture range, thereby allowing a clear slice image to be acquired.

Figure 18:
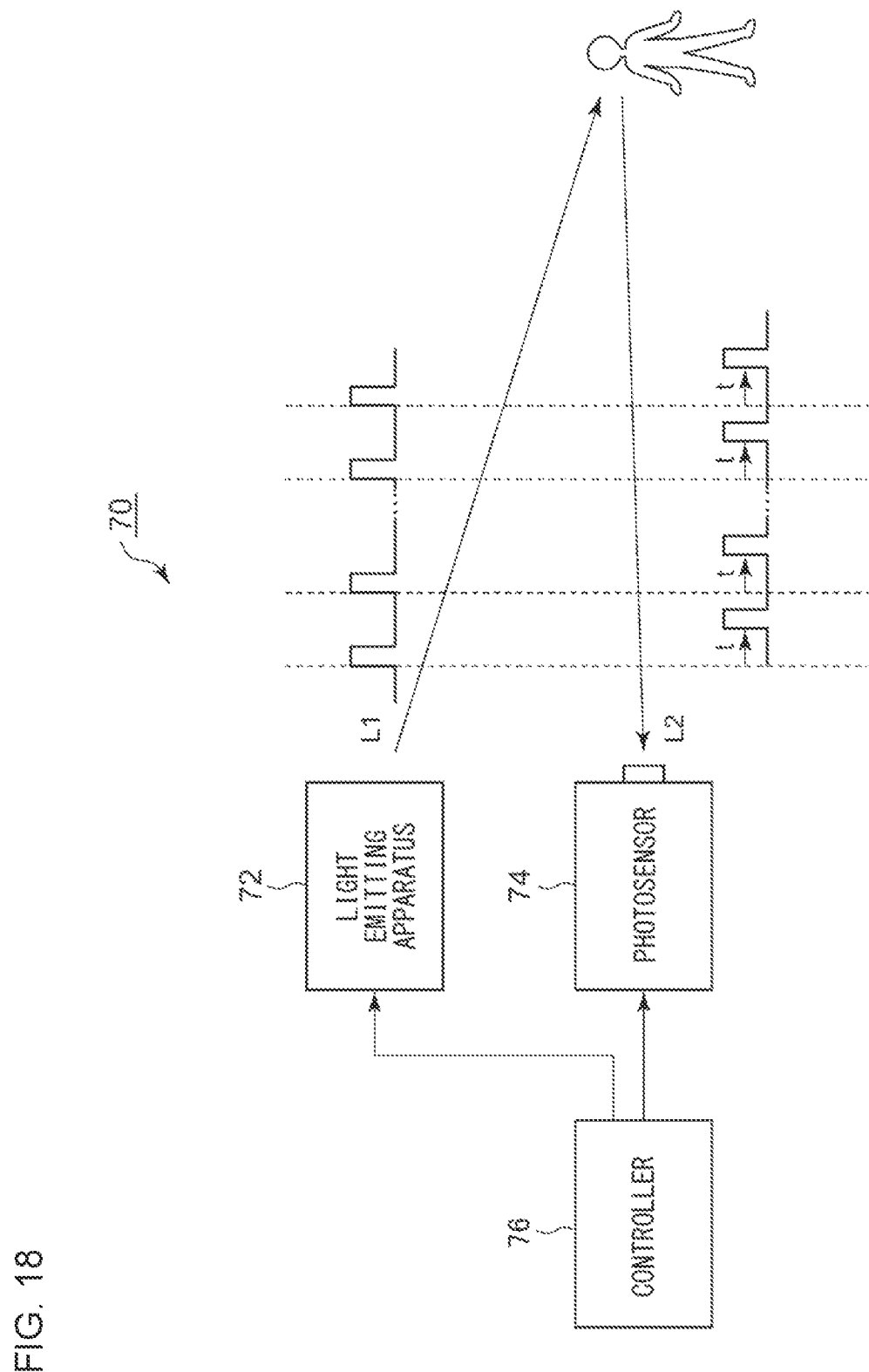
FIG. 18 is a block diagram showing an active sensor according to an embodiment 5.

FIG. 18 is a block diagram showing an active sensor 70 according to an embodiment 5. The active sensor 70 is configured as a gating camera, ToF camera, LIDAR, or the like. The active sensor 70 includes a light emitting apparatus 72, a photosensor 74, and a controller 76.

The light emitting apparatus 72 emits pulsed light multiple times for one instance of sensing. In the present embodiment, the light emitting apparatus 72 provides light emission timing with non-uniform time intervals $T_{INT}$. The time intervals $T_{INT}$ may be determined at random for each cycle. Also, the time intervals $T_{INT}$ may be changed according to a pattern determined beforehand. For example, the time intervals $T_{INT}$ may be monotonically increased or decreased for each operating period Tc.

The output light L1 of the light emitting apparatus 72 is reflected by the object OBJ, and is incident to the photosensor 74. The reflected light L2 has a delay τ with respect to the output light L1. Here, τ corresponds to the distance z to the object OBJ, and is represented by the following Expression (1). τ will be referred to as the "round-trip time".

$$\tau = 2 \times z/c \quad (1)$$

Here, c represents the speed of light.

The exposure timing and the exposure time are controlled so as to allow the photosensor 74 to detect each pulse included in the reflected light L1 in synchronization with the light emission provided by the light emitting apparatus 72 for every light emission thereof. The light emission timing of the light emitting apparatus 72 and the exposure timing of the photosensor 74 are controlled by the controller 76.

The reflected light L2 from the object is incident to the photosensor 74 multiple times according to multiple light emissions of the light emitting apparatus 72. The photosensor 74 integrates the reflected light thus received multiple times, and outputs a signal that corresponds to the integrated value.

Figure 19:
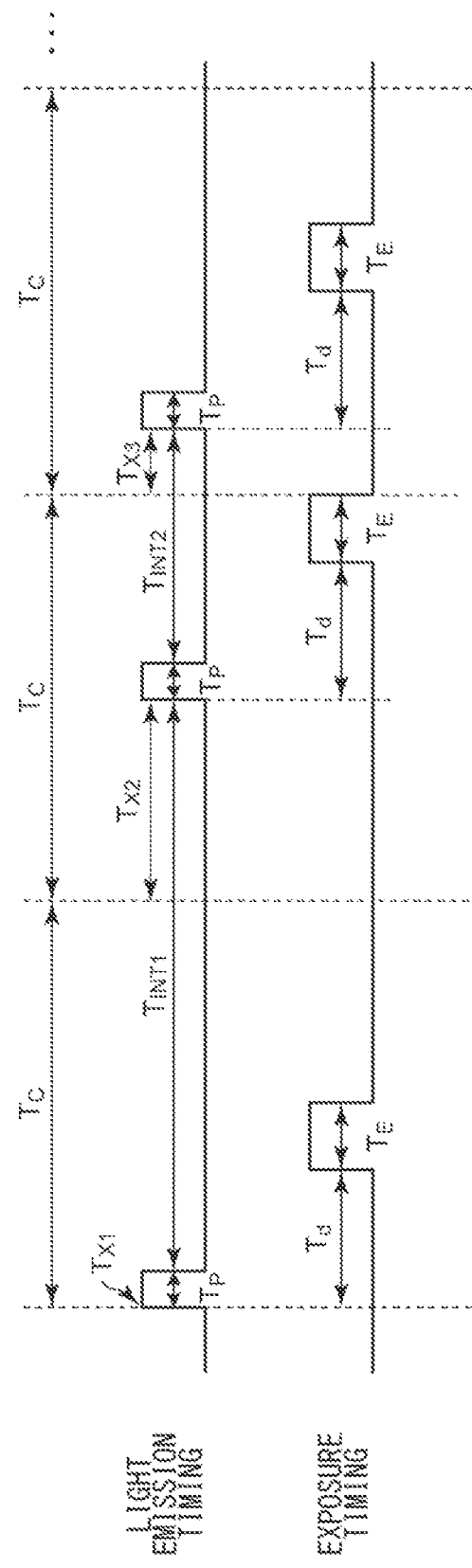
FIG. 19 is a time chart showing the relation between the light emission timing of the light emitting apparatus and the exposure timing of the photosensor.

FIG. 19 is a time chart showing the relation between the light emission timing of the light emitting apparatus 72 and the exposure timing of the photosensor 74. For example, the time point at which the exposure of the photosensor 74 is started may be set with a predetermined delay time Td from the time point at which the light emitting apparatus 72 starts to emit light. The method for determining the time difference Td may be determined according to the kind and method of the active sensor 70. For example, the time difference Td may be determined based on the round-trip time τ to an object of interest for image capture. The exposure time Te may be equal to or greater than the light emission time (pulse width) Tp provided by the light emitting apparatus 72.

Each instance of sensing including one light emission of the light emitting apparatus 72 and one exposure of the photosensor may be repeatedly executed with a predetermined period Tc. In this case, the light emission timing (period of time $T_x$ from the start of the period Tc to the light emission) of the light emitting apparatus 72 in the predetermined period Tc may be changed for each sensing. The time interval $T_{INTi}$ between the i-th light emission timing and the (i+1)-th light emission timing is represented by the following Expression (2).

$$T_{INTi} = Tc + T_{xi+1} - T_{xi} \quad (2)$$

The above is the configuration of the active sensor 70. Next, description will be made regarding the operation thereof.

Figure 20:
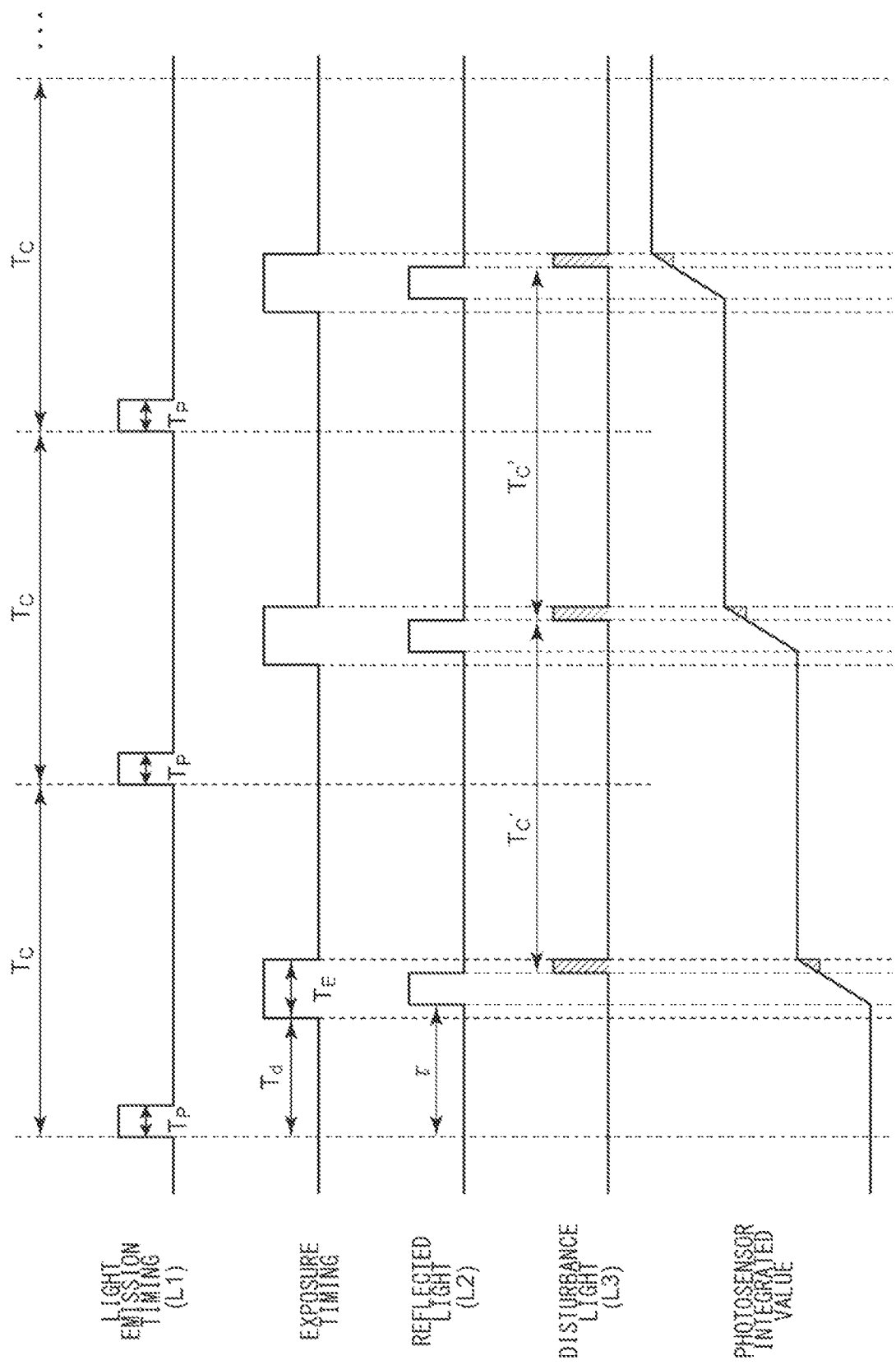
FIG. 20 is an operating waveform diagram showing the operation of an active sensor according to a comparison technique.

In order to clarify the advantages of the active sensor 70, first, description will be made regarding a comparison technique. In the comparison technique, the light emitting apparatus emits light at uniform time intervals, and exposure of the photosensor is executed at uniform time intervals. FIG. 20 is an operation waveform diagram of an active sensor according to such a comparison technique. Description will be made below assuming that there is another light source in the vicinity of the active sensor such that it emits pulsed light at a period Tc' obtained by multiplying or dividing the operating period Tc by an integer. In FIG. 20, the light emitted by the other light source is shown as disturbance light L3. In this example, description will be made assuming that the light emission period Tc' of the disturbance light is equal to the operating period Tc of the active sensor.

When each pulse of the disturbance light L3 is included in the exposure period Te, this has an effect on the sensing of the active sensor. In the comparison technique, the light emitting apparatus 72 emits light at a uniform light emission period $T_{INT}$ (Tc). Accordingly, the exposure is executed at a timing with a uniform interval (Tc).

With this, each pulse of the disturbance light L3 is always included in the corresponding exposure time Te. Accordingly, the effect of the disturbance light L3 is cumulative, leading to a large error. In FIG. 20, the error component is indicated by hatching.

Figure 21:
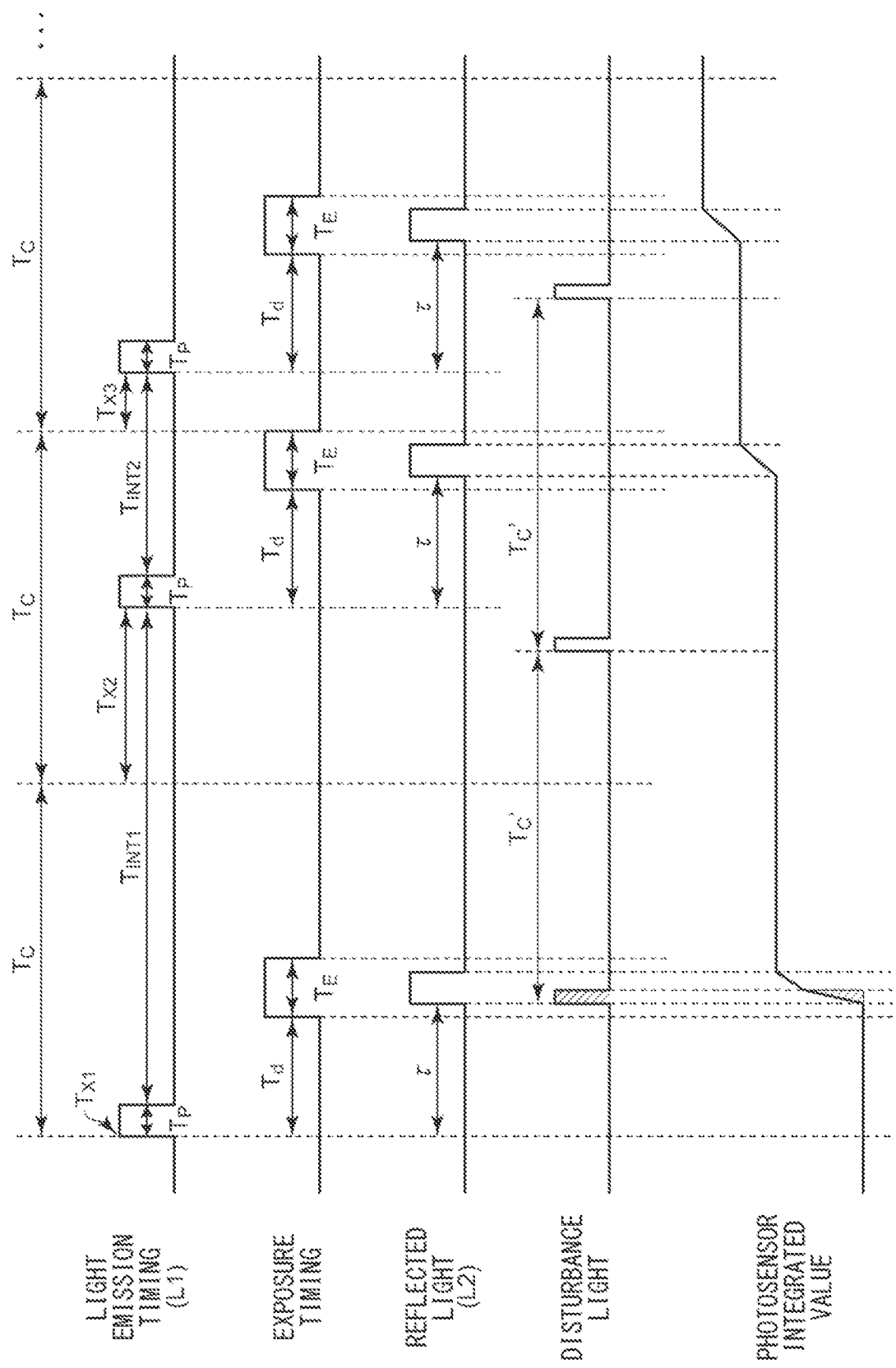
FIG. 21 is an operating waveform diagram showing the operation of the active sensor shown in FIG. 18.

Next, description will be made regarding the operation of the active sensor 70 according to the embodiment 5. FIG. 21 is an operating waveform diagram of the active sensor 70 shown in FIG. 18.

As described above, when each pulse of the disturbance light L3 is included in the exposure period Te, this has an effect on the sensing of the active sensor 70. With the present embodiment, the light emitting apparatus 72 emits light at non-uniform intervals $T_{INT}$. Accordingly, the exposure start time point is changed for each operating period Tc. With this, each pulse of the disturbance light L3 is included in the exposure time or is not included in the exposure time Te. In the example shown in FIG. 20, the first pulse of the disturbance light L3 is detected as a false detection signal. However, the subsequent pulses of the disturbance light L3 are out of the exposure period, thereby preventing false detection. Accordingly, this allows the effect of the disturbance light L3 to be reduced, thereby providing high-precision detection.

Next, description will be made regarding the usage of the active sensor 70. As an example, the active sensor 70 is configured as a gating camera.

Figure 22:
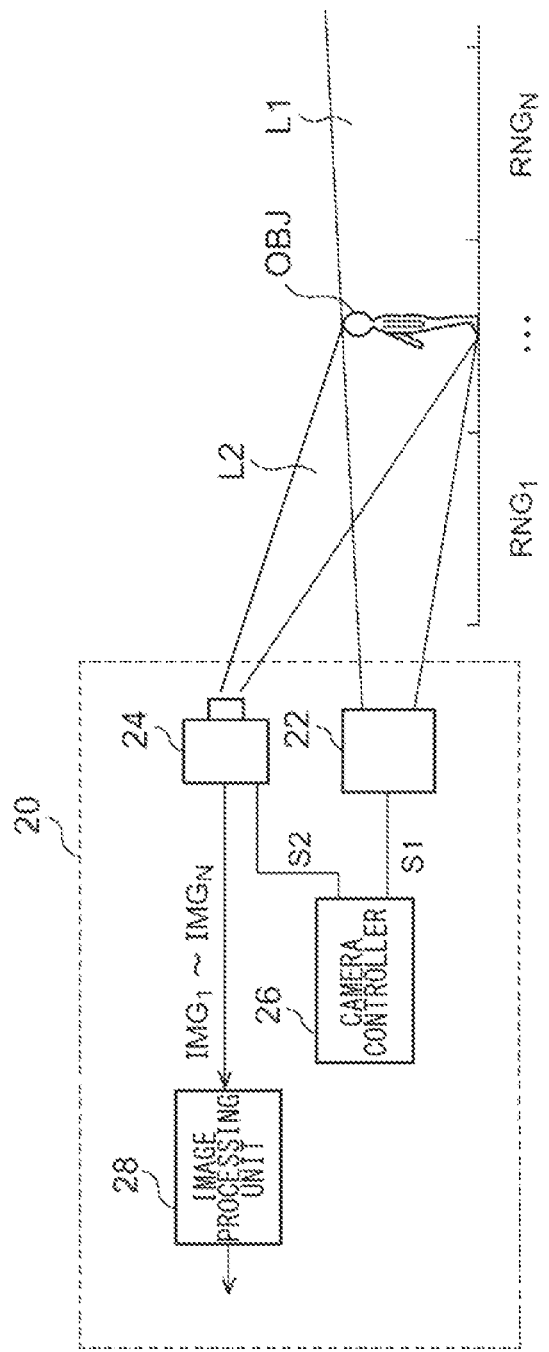
FIG. 22 is a block diagram showing a gating camera according to an example.

FIG. 22 is a block diagram showing a gating camera 20 according to an example. The gating camera 20 captures images for a plurality of N (N≥2) ranges $RNG_1$ through $RNG_N$ divided in the depth direction.

The gating camera 20 includes an illumination apparatus 22, an image sensor 24, a camera controller 26, and an image processing unit 28. The illumination apparatus 22 corresponds to the light emitting apparatus 72 shown in FIG. 18. The image sensor 24 corresponds to the photosensor 74 shown in FIG. 18. The camera controller 26 corresponds to the controller 76 shown in FIG. 18.

The illumination apparatus 22 illuminates probe light L1 in front of the vehicle in synchronization with a light emission timing signal S1 supplied from the camera controller 26. The probe light L1 is preferably generated as infrared light. However, the present invention is not restricted to such an arrangement. Also, the probe light L1 may be visible light having a predetermined wavelength. As described above, the pulses are generated at non-uniform time intervals.

The image sensor 24 is configured to support exposure control in synchronization with the exposure timing signal S2 supplied from the camera controller 26, and to be capable of generating slice images IMG. The image sensor 24 is sensitive to the same wavelength as that of the probe light L1. The image sensor 24 captures images of reflected light (returned light) L2 reflected by the object OBJ.

The camera controller 26 holds the light emission timing and the exposure timing determined for each of the image capture ranges RNG. When image capture is performed for a given image capture range $RNG_i$, the camera controller generates the light emission timing signal S1 and the exposure timing signal S2 based on the light emission timing and the exposure timing associated with the corresponding range, and executes image capture. The gating camera 20 is capable of generating multiple slice images $IMG_1$ through $IMG_N$ that correspond to the multiple ranges $RNG_1$ through $RNG_N$. The i-th slice image $IMG_i$ includes an object included in the corresponding range $RNG_i$.

Figure 23:
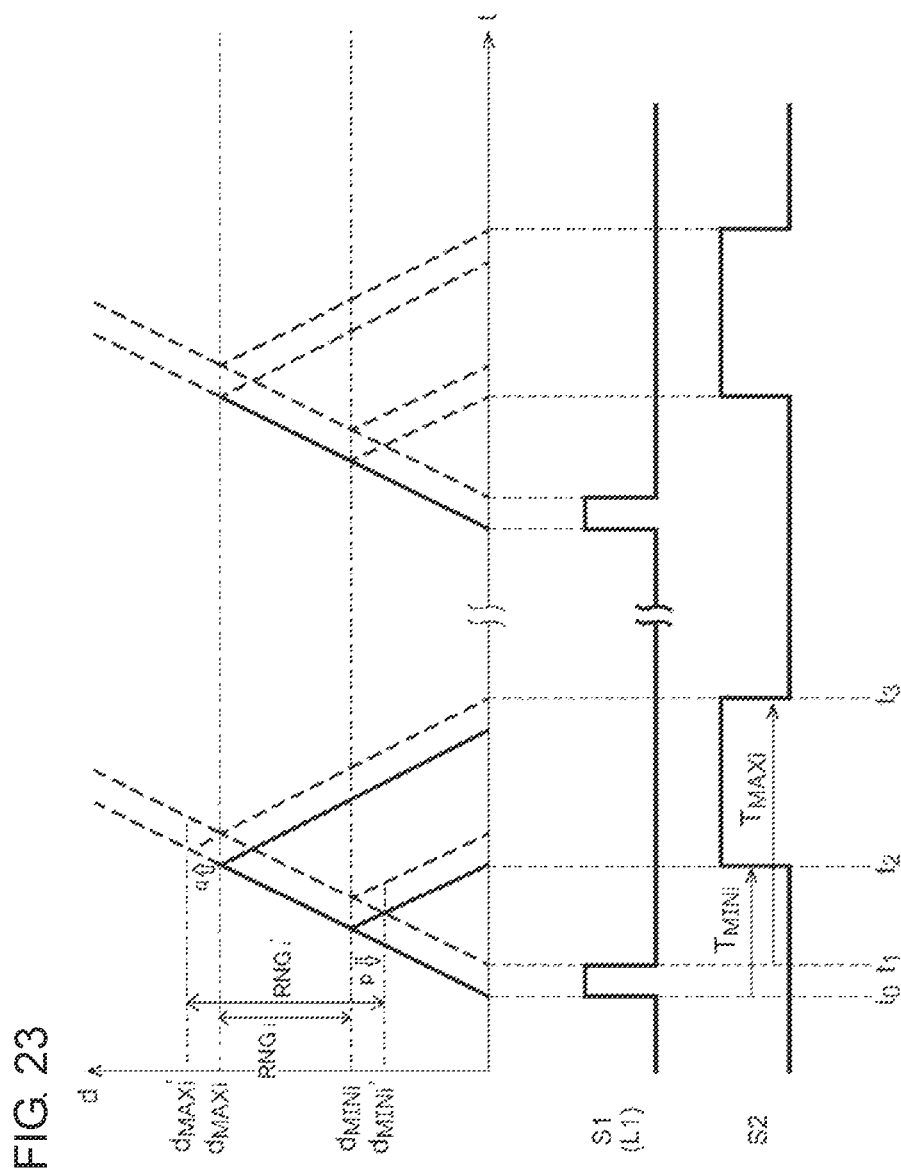
FIG. 23 is a diagram for explaining the operation of the gating camera.

FIG. 23 is a diagram for explaining the operation of the gating camera 20. FIG. 23 shows the operation when the i-th range $RNG_i$ is measured. The illumination apparatus emits light during a light-emitting period $\tau_1$ from the time point $t_0$ to $t_1$ in synchronization with the light emission timing signal S1. In the upper diagram, a light beam diagram is shown with the horizontal axis as time and with the vertical axis as distance. The distance between the gating camera 20 and the near-distance boundary of the range $RNG_i$ is represented by $d_{MINi}$. The distance between the gating camera 20 and the far-distance boundary of the range $RNG_i$ is represented by $d_{MAXi}$.

The round-trip time $T_{MINi}$, which is a period from the departure of light from the illumination apparatus 22 at a given time point, to the arrival of the light at the distance $d_{MINi}$, up to the return of the reflected light to the image sensor 24, is represented by $T_{MINi}=2\times d_{MINi}/c$. Here, c represents the speed of light.

Similarly, the round-trip time $T_{MAXi}$, which is a period from the departure of light from the illumination apparatus 22 at a given time point, to the arrival of the light at the distance $d_{MAXi}$, up to the return of the reflected light to the image sensor 24, is represented by $T_{MAXi}=2\times d_{MAXi}/c$.

When an image of an object OBJ included in the range $RNG_i$, is to be captured, the camera controller 26 generates the exposure timing signal S2 so as to start the exposure at the time point $t_2=t_0+T_{MINi}$, and so as to end the exposure at the time point $t_3=t_1+T_{MAXi}$. This is a single exposure operation.

When the image of the i-th range $RNG_i$ is captured, light emission and exposure are repeatedly executed multiple times, and the measurement results are integrated in the image sensor 24.

Figure 24:
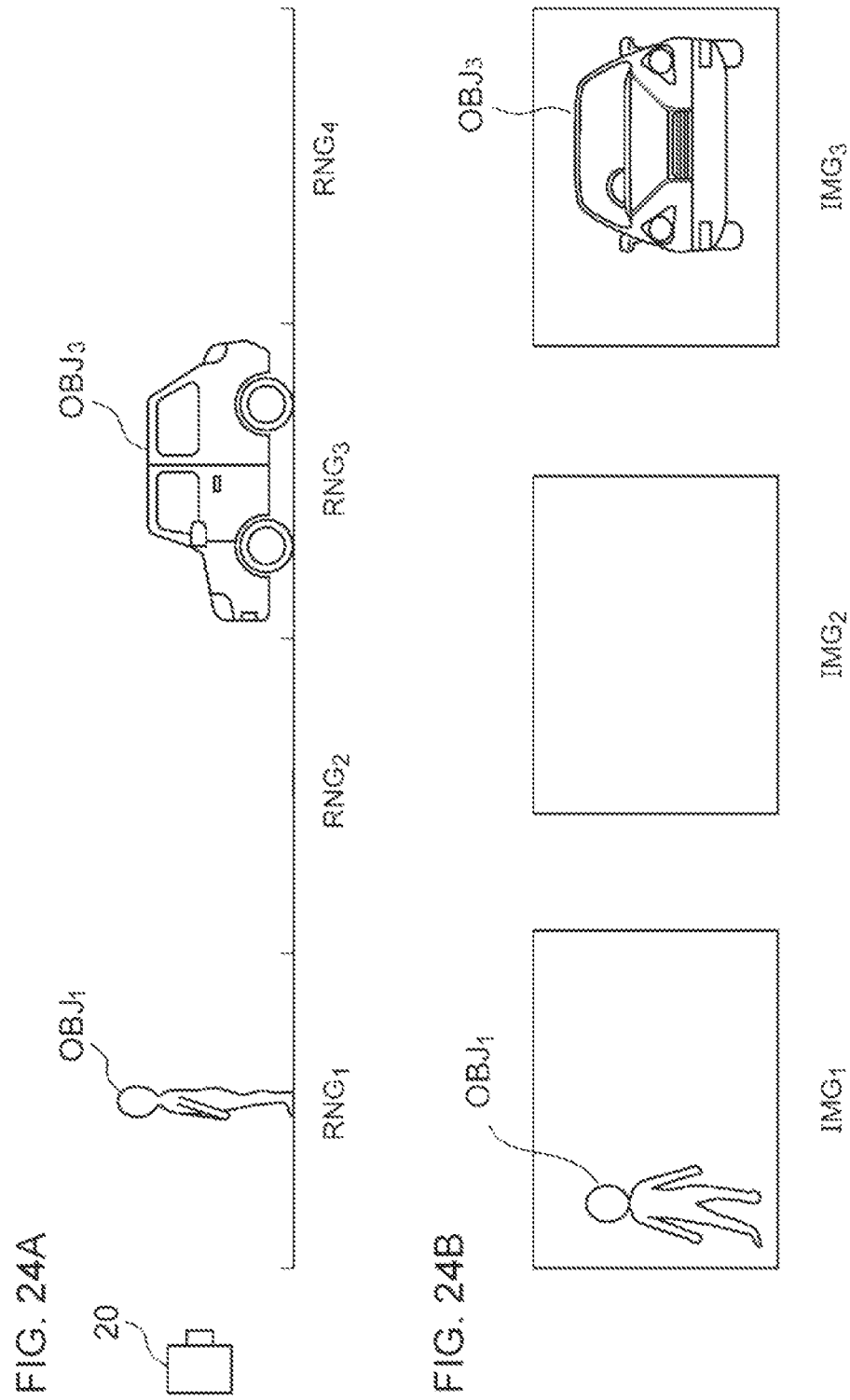
FIGS. 24A and 24B are diagrams for explaining an image acquired by the gating camera.

FIGS. 24A and 24B are diagrams for explaining an image acquired by the gating camera 20. FIG. 24A shows an example in which an object (pedestrian) $OBJ_1$ exists in the range $RNG_1$, and an object (vehicle) $OBJ_3$ exists in the range $RNG_3$. FIG. 24B shows multiple slice images $IMG_1$ through $IMG_3$ acquired in the situation shown in FIG. 24A. When the slice image $IMG_1$ is captured, the image sensor is exposed by only the reflected light from the range $RNG_1$. Accordingly, the image $IMG_1$ includes an object image $OBJ_1$ of the pedestrian $OBJ_1$.

When the slice image $IMG_2$ is captured, the image sensor is exposed by the reflected light from the range $RNG_2$. Accordingly, the slice image $IMG_2$ includes no object image.

Similarly, when the slice image $IMG_3$ is captured, the image sensor is exposed to the reflected light from the range $RNG_3$. Accordingly, the slice image $IMG_3$ includes only the object $OBJ_3$. As described above, with the gating camera 20, this arrangement is capable of capturing object images in the form of separate images for the respective ranges.

The above is the operation of the gating camera 20. With such a gating camera in which the illumination apparatus 22 emits light at non-uniform intervals, this is capable of reducing the effects of other pulsed light sources in the vicinity, thereby allowing a clear image to be acquired with a low noise component.

Description will be made regarding modifications relating to the embodiment 3.

Modification 1

The method for changing the time intervals $T_{INT}$ of pulsed light emission of the light emitting apparatus 72 is not restricted to such an arrangement shown in FIG. 19. For example, the operating period Tc may be changed for every cycle while maintaining $T_x$ at a constant value.

Modification 2

The active sensor 70 is not restricted to such a gating camera. Also, the active sensor 70 may be configured as a TOF (Time Of Flight) camera or LIDAR (Light Detection and Ranging, Laser Imaging Detection and Ranging).

Figure 25:
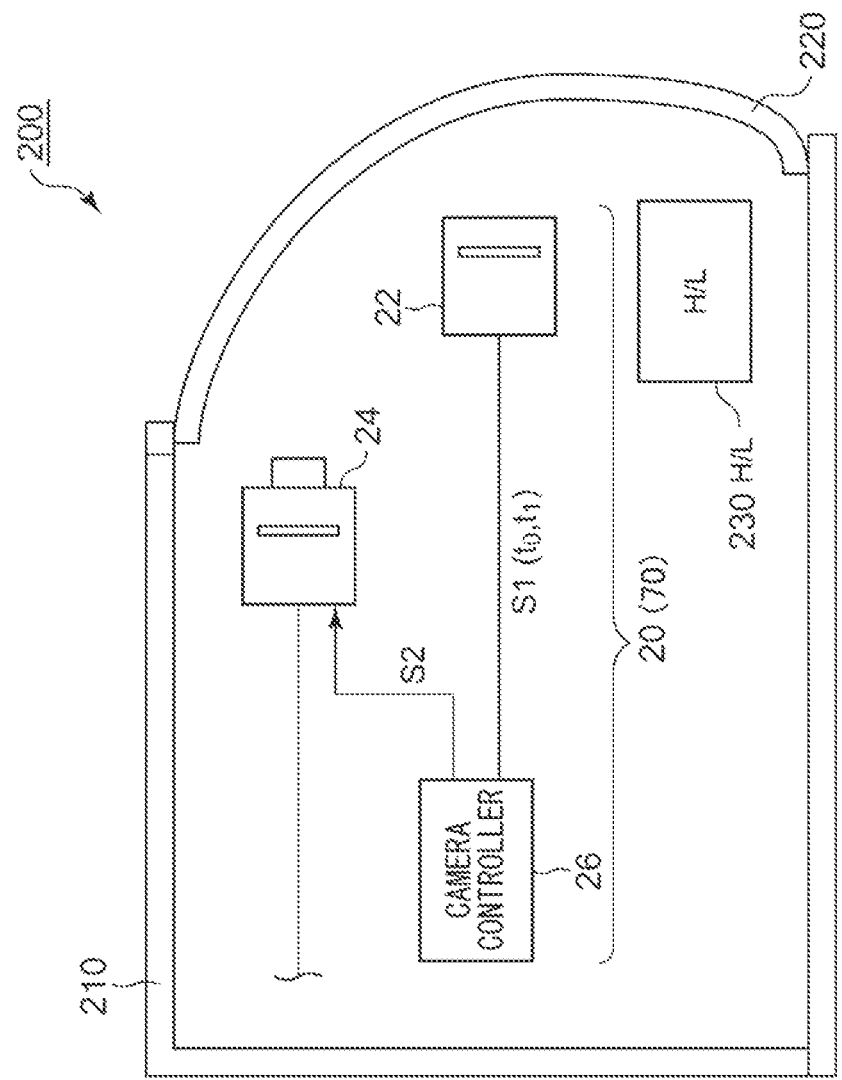
FIG. 25 is a diagram showing an automotive lamp including a gating camera or an active sensor as a built-in component.

FIG. 25 is a diagram showing an automotive lamp 200 including the gating camera 20 or the active sensor 70 as a built-in component thereof (description will be made below assuming that the automotive lamp 200 includes the gating camera). The automotive lamp 200 includes a housing 210, an outer lens 220, a high-beam and low-beam lamp unit 230H/230L, and the gating camera 20. The lamp unit 230H/230L and the gating camera 20 are housed in the housing 210.

It should be noted that a part of the gating camera 20, e.g., the image sensor 24, may be arranged as an external component of the automotive lamp 200, e.g., may be arranged on the back side of a rear-view mirror.

Figure 26:
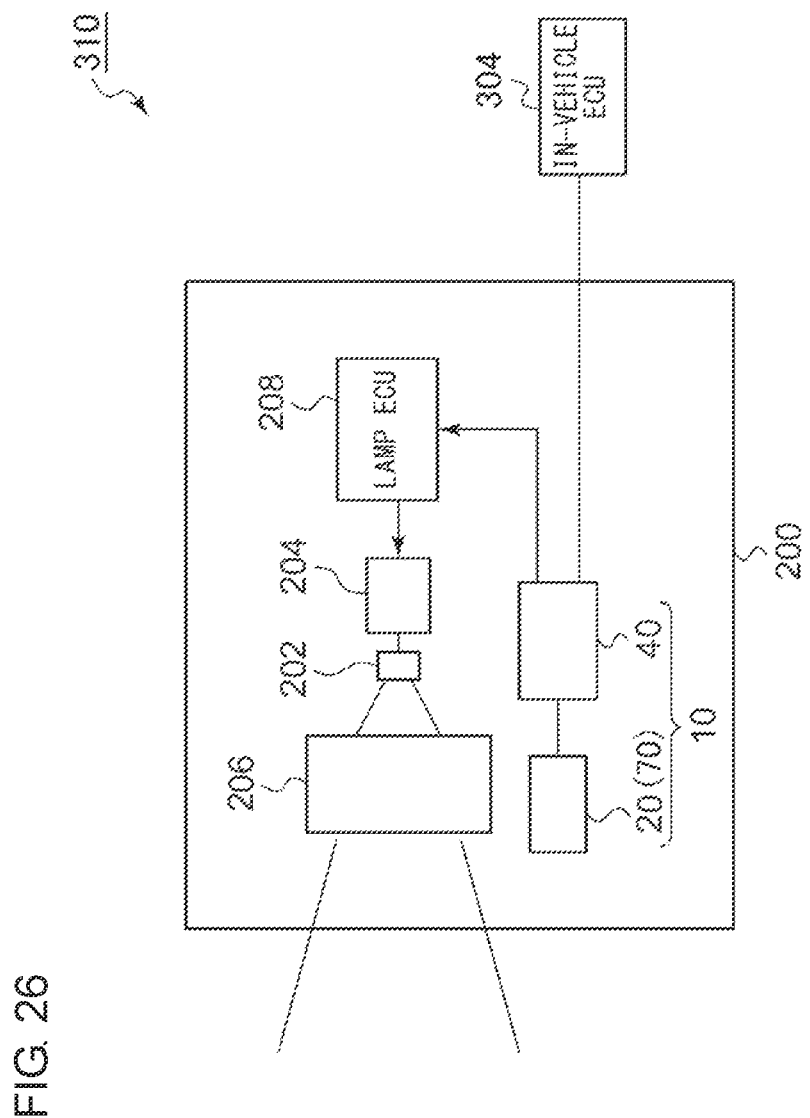
FIG. 26 is a block diagram showing an automotive lamp provided with an object identification system.

FIG. 26 is a block diagram showing the automotive lamp 200 provided with an object identification system 10. The automotive lamp 200 forms a lamp system 310 together with an in-vehicle ECU 304. The automotive lamp 200 includes a light source 202, a lighting circuit 204, and an optical system 206. Furthermore, the automotive lamp 200 includes the object identification system 10. The object identification system 10 includes the gating camera 20 (or active sensor 70) and a calculation processing device 40.

The calculation processing device 40 is configured to identify the kind of an object based on multiple slice images $IMG_1$ through $IMG_N$ that correspond to the multiple range $RNG_1$ through $RNG_N$ acquired by the gating camera 20. The calculation processing device 40 is provided with a classifier implemented based on a prediction model generated by machine learning. The algorithm employed by the classifier is not restricted in particular. Examples of the algorithms that can be employed include You Only Look Once (YOLO), Single Shot MultiBox Detector (SSD), Region-based Convolutional Neural Network (R-CNN), Spatial Pyramid Pooling (SPPnet), Faster R-CNN, Deconvolution-SSD (DSSD), Mask R-CNN, etc. Also, other algorithms that will be developed in the future may be employed.

The calculation processing device 40 may be configured as a combination of a processor (hardware component) such as a Central Processing Unit (CPU), Micro Processing Unit (MPU), microcontroller, or the like, and a software program to be executed by the processor (hardware component). Also, the calculation processing device 40 may be configured as a combination of multiple processors. Alternatively, the calculation processing device 40 may be configured as a hardware component alone.

Also, the information with respect to the object OBJ detected by the object identification system 10 may be used to support the light distribution control operation of the automotive lamp 200. Specifically, a lamp ECU 208 generates a suitable light distribution pattern based on the information with respect to the kind of the object OBJ and the position thereof generated by the object identification system 10. The lighting circuit 204 and the optical system 206 operate so as to provide the light distribution pattern generated by the lamp ECU 208.

The information with respect to the object OBJ thus detected by the calculation processing device 40 may be transmitted to the in-vehicle ECU 304. The in-vehicle ECU 304 may use this information to provide autonomous driving or driving assistance.

Description has been made regarding the present invention with reference to the embodiments using specific terms. However, the above-described embodiments show only an aspect of the mechanisms and applications of the present invention. Rather, various modifications and various changes in the layout can be made without departing from the spirit and scope of the present invention defined in appended claims.

CLAUSES DESCRIBING APPLICABILITY

11. A gating camera comprising:
an illumination apparatus structured to illuminate probe light;
an image sensor;
a camera controller structured to control a timing at which the illumination apparatus illuminates the probe light and a timing at which the image sensor is exposed, such that the image sensor outputs a slice image for each of image capture ranges divided in the depth direction while changing the image capture range, and such that each slice image includes only an object included in the corresponding image capture range; and
an image processing unit structured to receive the slice images from the image sensor, and to process the slice images,
wherein the camera controller is structured to be capable of adaptively controlling a data amount of the slice images transmitted from the image sensor to the image processing unit.

12. The gating camera according to clause 11, wherein the camera controller is structured to crop a part of the slice image so as to reduce a size of the slice image.

13. The gating camera according to clause 12, wherein a slice image group that corresponds to an image capture range group that is nearer than a predetermined distance is always transmitted without cropping,
and wherein, whether or not the slice image is to be cropped is controlled for a slice image group that corresponds to an image capture range group that is farther than the predetermined distance.

14. The gating camera according to clause 12, wherein the plurality of the slice images that correspond to the plurality of image capture ranges are transmitted without cropping,
and wherein, whether or not a plurality of subsequent slice images are to be cropped is determined based on the plurality of uncropped slice images.

15. The gating camera according to clause 12, wherein, in a first mode, all slice images that correspond to all image capture ranges are transmitted without cropping,
wherein, when a far-side slice image group that corresponds to an image capture range group that is farther than a predetermined distance transmitted in the first mode includes only a single object of interest, a mode is switched to a second mode,
and wherein, in the second mode, the far-side slice image group is transmitted after a region of interest thereof including the object of interest is cropped.

16. The gating camera according to clause 15, wherein the illumination apparatus is structured to be capable of focusing and diffusing the probe light so as to provide a variable illumination range, and wherein, when a slice image is to be transmitted with cropping, the camera controller instructs the illumination apparatus to focus the probe light.

17. A gating camera comprising: an illumination apparatus structured to illuminate probe light, and to be capable of focusing and diffusing the probe light so as to provide a variable illumination range;
an image sensor;
a camera controller structured to control a timing at which the illumination apparatus illuminates the probe light and a timing at which the image sensor is exposed, such that the image sensor outputs a slice image for each of image capture ranges divided in the depth direction while changing the image capture range, and such that each slice image includes only an object included in the corresponding image capture range; and
an image processing unit structured to receive the slice images from the image sensor, and to process the slice images,
wherein the camera controller controls an illumination range of the illumination apparatus based on detection results obtained by the image processing unit.

18. The gating camera according to clause 7, wherein, in a first mode, the probe light is illuminated to an entire illumination range,
wherein, in the first mode, when the image processing unit detects an object of interest in the slice image that corresponds to a predetermined image capture range, the first mode is switched to a second mode,
and wherein, in the second mode, when an image is captured for the predetermined image capture range, the probe light is illuminated to a region of interest including the object of interest.

19. An automobile comprising:
the gating camera according to clause 11; and
a calculation processing device structured to process an output of the gating camera.

20. An automotive lamp comprising the gating camera according to clause 11.

21. An active sensor comprising:
a light emitting apparatus structured to emit a pulsed light multiple times at non-uniform time intervals; and
a photosensor structured to detect reflected light from an object at a timing in synchronization with light emission of the light emitting apparatus for every light emission.

22. The active sensor according to clause 21, wherein one instance of sensing including a single light emission of the light emitting apparatus and a single exposure of the photosensor is repeatedly executed with a predetermined cycle,
and wherein the light emission timing of the light emitting apparatus in the predetermined cycle is changed for each sensing.

23. The active sensor according to clause 21, wherein the active sensor is structured as a gating camera structured to change a time difference between light emission and image capture for each of ranges divided in the depth direction, so as to be capable of acquiring a plurality of images that correspond to the plurality of ranges.

24. The active sensor according to clause 21, structured as a Time Of Flight (TOF) camera.

25. The active sensor according to clause 21, structured as a LIDAR (Light Detection and Ranging, Laser Imaging Detection and Ranging).

26. An object identification system comprising:
the active sensor according to clause 21; and
a calculation processing device structured to be capable of identifying a kind of an object based on an image acquired by the active sensor.

27. An automotive lamp comprising the object identification system according to clause 26.

28. A vehicle comprising the object identification system according to clause 26.

What is claimed is:
1. A gating camera comprising:
an illumination apparatus configured to illuminate probe light;
an image sensor;
a camera controller configured to control a timing at which the illumination apparatus illuminates the probe light and a timing at which the image sensor is exposed, such that the image sensor outputs a slice image for each of image capture ranges divided in the depth direction while changing the image capture range, and such that each slice image includes only an object included in the corresponding image capture range; and
one or more processors configured to generate a final image including an entire object of interest based on the plurality of slice images that correspond to the plurality of image capture ranges
wherein the final image includes only the object of interest.

2. The gating camera according to claim 1, wherein the one or more processors is further configured to combine the plurality of slice images so as to generate a combined image, each pixel of which indicates distance information, and to extract a region including the object of interest from the combined image.

3. A gating camera comprising:
an illumination apparatus configured to illuminate probe light;
an image sensor;
a camera controller configured to control a timing at which the illumination apparatus illuminates the probe light and a timing at which the image sensor is exposed, such that the image sensor outputs a slice image for each of image capture ranges divided in the depth direction while changing the image capture range, and such that each slice image includes only an object included in the corresponding image capture range; and
one or more processors configured to combine the plurality of slice images that correspond to the plurality of image capture ranges so as to generate a combined image, each pixel of which indicates distance information.

4. An automobile comprising:
the gating camera according to claim 1; and
a calculation processor configured to process an output of the gating camera.

5. An automotive lamp comprising the gating camera according to claim 1.

6. An image processor for a gating camera,
wherein the gating camera comprises:
an illumination apparatus configured to illuminate probe light;
an image sensor; and
a camera controller configured to control a timing at which the illumination apparatus illuminates the probe light and a timing at which the image sensor is exposed, such that the image sensor outputs a slice image for each of image capture ranges divided in the depth direction while changing the image capture range, and such that each slice image includes only an object included in the corresponding image capture range, and wherein the image processor is configured to extract slice images including an object of interest from among the plurality of slice images that correspond to the plurality of image capture ranges, and to combine the extracted slice images so as to generate a final image.

7. An image processing method employed in a gating camera, wherein the gating camera comprises:

an illumination apparatus configured to illuminate probe light;

an image sensor; and a camera controller configured to control a timing at which the illumination apparatus illuminates the probe light and a timing at which the image sensor is exposed, such that the image sensor outputs a slice image for each of image capture ranges divided in the depth direction while changing the image capture range, and such that each slice image includes only an object included in the corresponding image capture range, wherein the image processing method comprises:

extracting slice images including an object of interest from among the plurality of slice images that correspond to the plurality of image capture ranges; and combining the extracted slice images so as to generate a final image.

8. An image processor for a gating camera, wherein the gating camera comprises:

an illumination apparatus configured to illuminate probe light;

an image sensor; and a camera controller configured to control a timing at which the illumination apparatus illuminates the probe light and a timing at which the image sensor is exposed, such that the image sensor outputs a slice image for each of image capture ranges divided in the depth direction while changing the image capture range, and such that each slice image includes only an object included in the corresponding image capture range, and wherein the image processor is configured to combine the plurality of slice images that correspond to the plurality of image capture ranges so as to generate a combined image, each pixel of which indicates distance information.

9. An image processing method employed in a gating camera, wherein the gating camera comprises:

an illumination apparatus configured to illuminate probe light;

an image sensor; and a camera controller configured to control a timing at which the illumination apparatus illuminates the probe light and a timing at which the image sensor is exposed, such that the image sensor outputs a slice image for each of image capture ranges divided in the depth direction while changing the image capture range, and such that each slice image includes only an object included in the corresponding image capture range, and wherein the image processing method comprises combining the plurality of slice images that correspond to the plurality of image capture ranges so as to generate a combined image, each pixel of which indicates distance information.

10. The gating camera according to claim 1, wherein the output slice images for the image capture ranges include a plurality of objects, and wherein the final image includes only the object of interest from the plurality of objects.

* * * * *